(12) United States Patent
Scranton et al.

(10) Patent No.: US 7,141,615 B2
(45) Date of Patent: Nov. 28, 2006

(54) PHOTOCHEMICAL METHOD TO ELIMINATE OXYGEN INHIBITION OF FREE RADICAL POLYMERIZATIONS

(75) Inventors: Alec Scranton, Coralville, IA (US); Lijing Gou, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 10/752,778

(22) Filed: Jan. 7, 2004

(65) Prior Publication Data

US 2004/0152801 A1    Aug. 5, 2004

Related U.S. Application Data

(60) Provisional application No. 60/438,486, filed on Jan. 7, 2003.

(51) Int. Cl.
*C08F 2/46* (2006.01)
(52) U.S. Cl. .............. 522/178; 522/902; 522/186; 522/184; 522/182; 522/183
(58) Field of Classification Search ............. 522/178, 522/182, 183, 184, 186, 902
See application file for complete search history.

(56) References Cited

U.S. PATENT DOCUMENTS 4,271,259 A * 6/1981 Breslow et al. .......... 430/286.1
4,272,610 A * 6/1981 Breslow et al. ............ 430/302
4,563,413 A * 1/1986 Messer ................... 430/281.1
4,666,824 A * 5/1987 Messer ....................... 430/325

OTHER PUBLICATIONS

Battino and Clever, "The Solubility of Gases in Liquids." *Chem. Rev.* 66:395-463 (1966).
Decker et al., "Elimination of Oxygen Inhibition in Photopolymerization." *Photograp. Sci. Eng.* 23:137-140 (1979).
Decker, "A Novel Method for Consuming Oxygen Instantaneously in Photopolymerizable Films." *Makromol. Chem.* 180:2027-2030 (1979).
Guth et al., "Investigation of corrosion phenomena on chemical microsensors." *Electrochimica Acta.* 47( 1-2):201-210 (Sep. 1, 2001).
Ranby and Rabek, *Photodegradation, photo-oxidation and photostabilization of Polymers*, Wiley Interscience, London pp. 313-315 (1975).
Spiller et al., "Singlet Oxygen Quantum Yields of Different Photosensitizers in Polar Solvents and Micellar Solutions." *J. Porphyr. Phthalocya.* 2(2):145-158 (Mar.-Apr. 1998).
Wasserman and Murray, *Singlet Oxygen* 234 (1979).

* cited by examiner

*Primary Examiner*—Sanza L. McClendon

(57) ABSTRACT

Compositions and methods for addressing oxygen inhibition in free radical polymerization systems and determination of oxygen content in a monomer or oligomer. The compositions used include a singlet oxygen generator and a singlet oxygen trapper. Addition of the generator and trapper resulting in removal of oxygen can occur before polymerization or essentially simultaneously with polymerization. Determination of oxygen content comprises monitoring the concentration changes from the reaction of the singlet oxygen trapper with the oxygen in the system.

31 Claims, 19 Drawing Sheets

R=

*a*

*b*

*a*

*b*

*a*

*b*

*c*

PHOTOCHEMICAL METHOD TO ELIMINATE OXYGEN INHIBITION OF FREE RADICAL POLYMERIZATIONS

CROSS REFERENCE TO RELATED APPLICATIONS

This application claims the benefit of U.S. Provisional Application No. 60/438,486, filed Jan. 7, 2003.

STATEMENT REGARDING FEDERALLY SPONSORED RESEARCH OR DEVELOPMENT

This invention was made with government support under NSF Industry/University Cooperative Research Center (IUCRC) Grant EEC 00-02971 awarded by NSF. The government may have certain rights in the invention.

BACKGROUND OF THE INVENTION

1. Field of the Invention

This invention relates generally to oxygen inhibition in polymerization.

2. Background

Free radical polymerization is by far the most widely used chain polymerization technique for industrial applications. These industrial applications include, for example, thin films, coatings, coating and paint industries, adhesives, optics, dental filling, sealing compound, and stereo-lithography. These reactions offer many advantages over other polymerizations, including 1) high reaction rates, 2) insensitivity to impurities (compared to anionic and cationic polymerizations), and 3) a wide selection of commercially available monomers and oligomers. However, the vulnerability of free radical polymerizations to inhibition by molecular oxygen remains a significant problem with the technique.

Oxygen inhibition is perhaps the most important unsolved problem in free radical polymerization. Molecular oxygen, with its extraordinary biradical structure and high reactivity towards electron rich groups, participates in numerous chemical and biochemical processes which in some degree determine the ultimate outcome of these reactions. The possible interactions between oxygen and the polymerization system include two mechanisms:

1) physical quenching of the triplet state of the initiator or sensitizer and
2) scavenging of the free radicals/active radical centers (primary or the propagating chain) to produce unreactive peroxide radicals.

Both of these mechanisms of oxygen inhibition will significantly reduce the polymerization rate until the oxygen in the system is consumed. Oxygen inhibition 1) reduces the polymerization rate, 2) may reduce the primary polymer chain length, and 3) limits the ultimate attainable conversion in polymerization systems. The presence of oxygen in free radical polymerization systems is known to be the primary cause of an inhibition period and will ultimately affect the attainable properties of the polymer. In an open system where the oxygen will diffuse into the sample incessantly, an incomplete surface cure of the polymer will generally be observed.

Discovering an efficient way to eliminate oxygen inhibition has been a long-standing goal of polymerization scientists and engineers. As a result, a number of approaches have been tried to mitigate the effect of oxygen in free radical polymerizations. Because no satisfactory method has been reported, polymerization often must be carried out under an inert nitrogen atmosphere using expensive inerting equipment.

Many of the current approaches involve the creation of an oxygen barrier (for example, paraffin wax) to prevent the diffusion of oxygen into the system. These barrier approaches are not widely applicable since in many cases it is impractical to add a barrier layer.

The most common method to counter the effect of oxygen is simply to add enough initiator to create enough active centers to both react with the oxygen and polymerize the monomer. This method is not very satisfactory for many cases since the presence of the oxygen still leads to an inhibition period and reduces the length of the polymer chains (often leading to a tacky surface even after cure).

Other current methods for mitigating the effect of oxygen on free radical polymerizations are based on oxygen scavengers (such as tertiary amines). These methods are not satisfactory for many reactions and are fundamentally different from the invention described herein. For example, one way in which prior methods differ is use of a tertiary amine radical capable of forming a hydroperoxide is also capable of initiating the polymerization, therefore, it is not possible to decouple the oxygen depletion and the polymerization using this oxygen scavenger technique (therefore, the deleterious effect on the molecular weight will still be present using oxygen scavengers). In addition, it is often undesirable to add an amine to the reaction system, since the presence of the amines could lead to a residual odor in polymer product, may be toxic, and may lower the shelf life of the formulation.

Two papers published by Christian Decker (C. Decker, Makromol. Chem. 180, 2027, 1979 and C. Decker, J. Faure, M. Fizet, and L. Rychla, Photographic Science and Engineering, 23, 137, 1979) are directed toward addressing the oxygen inhibition problem. In both of these papers, Decker reports using the dye methylene blue (excited using a flash lamp with a 500–800 nm filter) to photochemically transfer ground state oxygen into singlet oxygen and then reacting the singlet oxygen with the compound diphenylisobenzofuran (DPBF) to consume the oxygen. The resulting oxidation product, orthodibenzoylbenzene, may further act as an efficient photoinitiator of the polymerization.

While both the Decker method and the current method involve the production of singlet oxygen by reaction with a light-absorbing molecule, followed by the reaction of the singlet oxygen with a second compound, there are many important differences between the system reported by Decker and the current invention. Some of the differences are 1) The singlet oxygen generators used in the current invention are much more versatile than the Decker dye sensitizer, methylene blue (the current singlet oxygen generators are soluble in a wider range of monomers and exhibit unique photochemical properties that are not offered by methylene blue).
2) The singlet oxygen generators used in the current invention do not lead to the production of active centers by themselves or by interaction with common initiators. Methylene blue will photoinitiate polymerization by itself and will interact with common initiators and coinitiators (such as amines) to create active centers.
3) The singlet oxygen generators used in the current invention undergo much less photobleaching than methylene blue and rose bengal during pre-illumination thereby allowing much more efficient production of singlet oxygen.

4) The only compound Decker described as the singlet oxygen acceptor is DPBF (1,3-diphenylisobenzofuran). DPBF does not meet the criteria (described below) as a singlet oxygen trapper because, for one thing, it is not stable in most monomers (especially acrylic monomers)—the C=C double bond in an acrylic monomer is a good dienophile and has a strong possibility to undergo a Diels-Alder reaction with DPBF (studies have shown that the compound decomposes rapidly in 2-hydroxyethylmethacrylate (HEMA) and butylmethacrylate monomers, totally degrading in less than 30 minutes). This drawback significantly limits the application of DPBF in polymerization systems.

The "consumption" of oxygen prior to the initiation step, as described below for the current invention, is clearly a different fundamental approach than other methods of dealing with oxygen inhibition. The current invention allows the initiation and oxygen depletion to be decoupled, which is not possible if using excess initiator to deplete the oxygen, providing flexibility in the design of the polymerization process. The current invention will reduce the cost of free radical polymerization by eliminating the need for nitrogen purging and its associated complicated equipment. The current invention also allows oxygen to be consumed before the polymerization begins, thus, leading to an increase in primary polymer chain length.

SUMMARY OF THE INVENTION

The invention, as embodied and broadly described herein, relates to compositions and methods for addressing oxygen inhibition in a free radical polymerization system.

Disclosed is a method for addressing oxygen inhibition in a free radical polymerization system comprising
(a) adding
  (i) a singlet oxygen generator,
  (ii) a singlet oxygen trapper,
  (iii) a free radical polymerizable monomer or oligomer, and
  (iv) an initiator;
(b) illuminating the system at a wavelength which activates the singlet oxygen generator; and
(c) initiating polymerization of the monomer or oligomer.
The method can further comprise
(d) decomposing an oxygenated trapper product generated by a reaction between the singlet oxygen trapper and the singlet oxygen generated by the singlet oxygen generator.

Also disclosed is a composition for addressing oxygen inhibition in a free radical polymerization system/improved free radical polymerization comprising
  (a) a singlet oxygen generator and
  (b) a singlet oxygen trapper.
Additionally disclosed is a method of free radical polymerization comprising
(a) adding
  (i) a singlet oxygen generator,
  (ii) a singlet oxygen trapper,
  (iii) a monomer or oligomer, and
  (iv) an initiator;
(b) pre-illuminating (i)–(iv) wherein the wavelength excites the singlet oxygen generator;
(c) initiating polymerization of the monomer or oligomer.
A method of free radical polymerization is disclosed which comprises
(a) adding
  (i) a singlet oxygen generator,
  (ii) a singlet oxygen trapper,
  (iii) a monomer or oligomer,
  (iv) a photoinitiator;
(b) illuminating by a first wavelength and a second wavelength wherein the first wavelength excites the singlet oxygen generator and of the monomer or aligomers is initiated.

A method is also disclosed comprising
(a) adding
  (i) a singlet oxygen generator,
  (ii) a singlet oxygen trapper,
  (iii) a monomer or oligomer;
(b) consuming oxygen by activating the singlet oxygen generator in the presence of molecular oxygen to form singlet oxygen whereby the singlet oxygen trapper consumes the singlet oxygen; and
(c) initiating polymerization of the monomer or oligomer.

A method of increasing the rate of free radical polymerization in an oxygen-containing environment is disclosed comprising
(a) adding a singlet oxygen generator and a singlet oxygen trapper to a free radical polymerization system wherein the free radical polymerization system comprises monomer or oligomer and initiator,
(b) illuminating the system at a wavelength which activates the singlet oxygen generator,
(c) initiating the polymerization of the monomer or oligomer.

A method of avoiding an inhibition period in free radical polymerization in an oxygen-containing environment is disclosed comprising
(a) adding a singlet oxygen generator and a singlet oxygen trapper to a free radical polymerization system wherein the free radical polymerization system comprises monomer or oligomer and initiator,
(b) illuminating the system at a wavelength which activates the singlet oxygen generator,
(c) initiating the polymerization of the monomer or oligomer.

A method of increasing primary polymer chain length in free radical polymerization in an oxygen-containing environment is disclosed comprising
(a) adding a singlet oxygen generator and a singlet oxygen trapper to a free radical polymerization system wherein the free radical polymerization system comprises monomer or oligomers and initiator,
(b) illuminating the system at a wavelength which activates the singlet oxygen generator,
(c) initiating the polymerization monomer or oligomer.

Further disclosed is a method of determining oxygen concentration in a monomer or oligomer comprising
(a) adding
  (i) a singlet oxygen generator,
  (ii) a singlet oxygen trapper,
  (iii) a monomer or oligomer;
(b) consuming oxygen by activating the singlet oxygen generator in the presence of molecular oxygen to form singlet oxygen whereby the singlet oxygen trapper consumes the singlet oxygen;
(c) monitoring a change in concentration of singlet oxygen trapper until the concentration of singlet oxygen trapper is stable; and
(d) correlating the stable concentration of singlet oxygen trapper with the concentration of oxygen.

The invention, in one aspect, relates to a method for overcoming the oxygen inhibition of free radical polymerizations. The method comprises the addition of two specially selected components in the reactive formulation: 1) a light-absorbing molecule which interacts with ground state (triplet) oxygen to produce an excited (singlet) state of oxygen (hereafter this compound will be called the "singlet oxygen generator") and 2) a second compound which reacts with the singlet oxygen, thereby "removing" (i.e., converting the molecular oxygen to the excited singlet oxygen and reacting it with the trapper) the oxygen from the system (hereafter the "singlet oxygen trapper").

A variety of singlet oxygen generators (e.g., photoinduced or thermally induced) with different light absorption spectra are described below and can be used in this invention. The method can be used with either light-induced polymerizations or thermally-induced polymerizations. In addition, criteria for selection of the singlet oxygen trapper are taught and specific examples presented.

Advantages of the invention will be set forth in part in the description which follows, and in part will be obvious from the description, or may be learned by practice of the invention. Advantages of the invention can be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate aspects of the invention and together with the description, serve to explain the principles of the invention.

A=DMPA with nitrogen (N$_2$) purging
B=DMPA in air
C=DMPA+Zn-ttp+DMA in air with 20 sec. pre-illumination
Photoinitiator: 0.05 M DMPA, SG: 2.0×10$^{-5}$M Zn-ttp, ST: 1.4×10$^{-3}$ M DMA. UV light intensity: 0.35 mW/cm$^2$.

Figure 19:
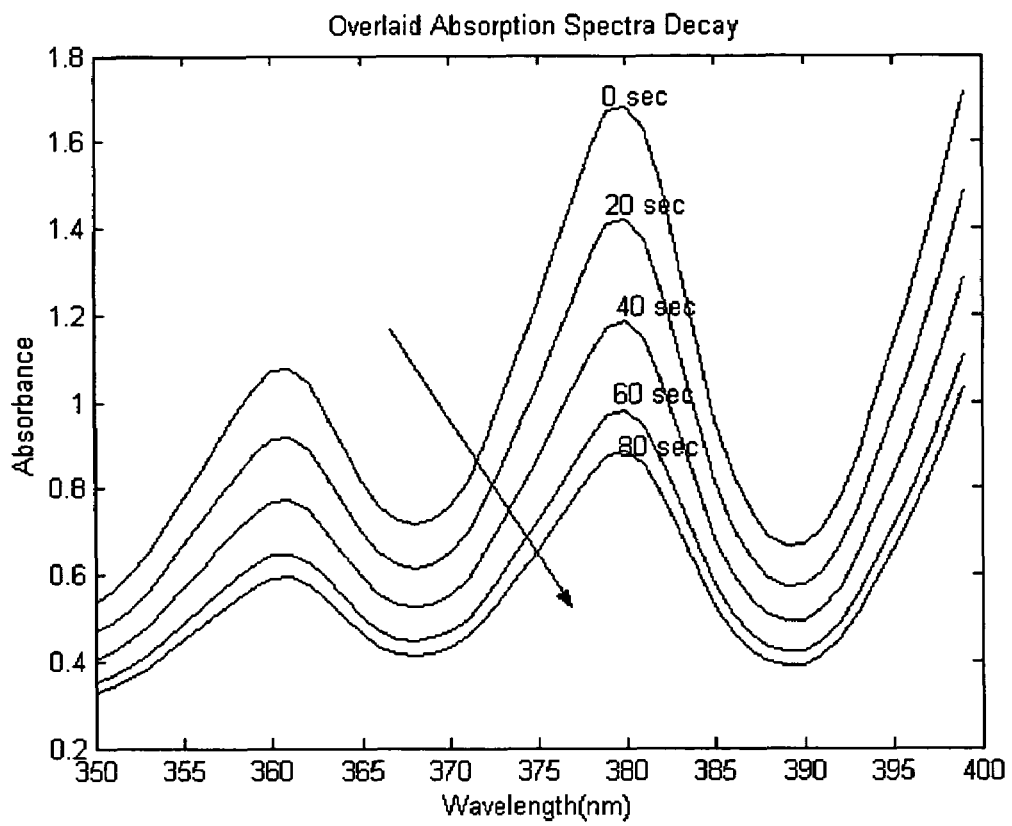
Figure 19:
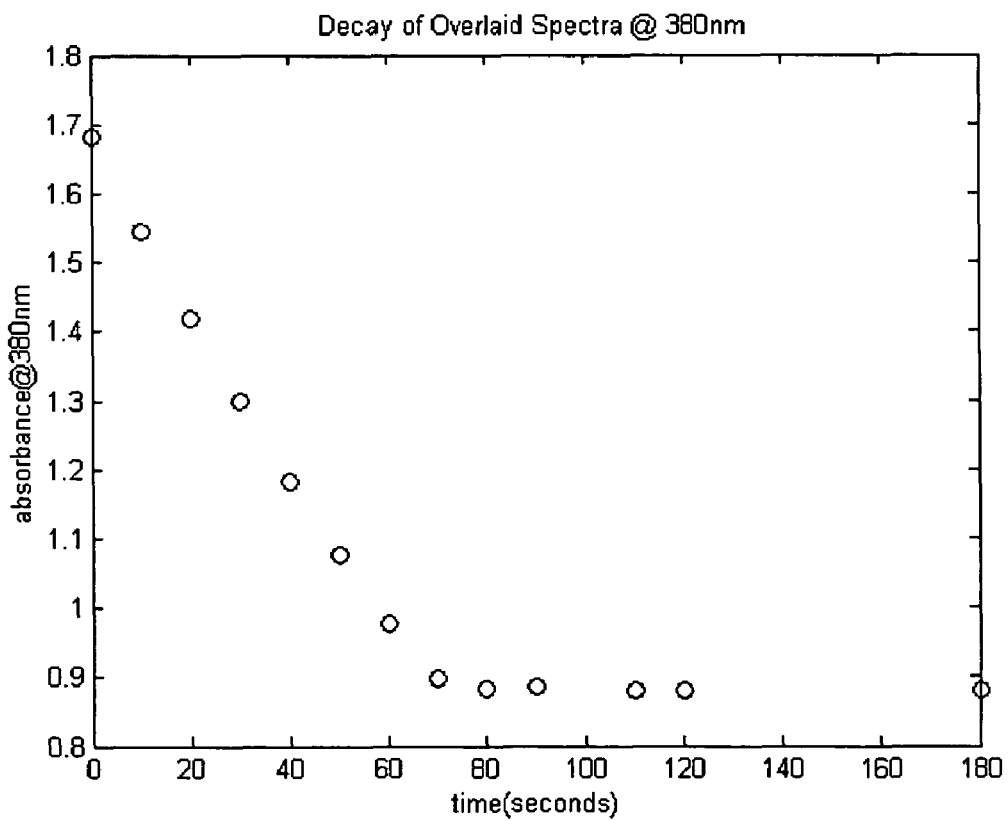

FIG. 19 illustrates the overlaid absorption spectra decay of HEMA solution containing 1×10$^{-4}$ M Zn-tpp and 1.8×10$^{-3}$ M DMA in Example 10.

DESCRIPTION OF THE PREFERRED EMBODIMENTS

Before the present compounds, compositions, articles, devices, and/or methods are disclosed and described, it is to be understood that this invention is not limited to specific synthetic methods of the components, specific synthetic methods as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

Definitions

It must be noted that, as used in the specification and the appended claims, the singular forms "a," "an," and "the" include plural referents unless the context clearly dictates otherwise. Thus, for example, reference to "an initiator" includes mixtures of initiators, reference to "a singlet oxygen generator" includes mixtures of two or more such singlet oxygen generators, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not. For example, the phrase "optionally initiator" means that initiator may or may not be added and that the description includes both the addition of initiator and no addition of initiator.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

"Singlet oxygen generator," SG, as used herein refers to a light-absorbing composition which interacts with ground state (triplet) oxygen to produce an excited (singlet) state of oxygen but does not produce active centers by itself or by interaction with common initiators. A "singlet oxygen generator" of the invention also does not photobleach under conditions of the desired reactions.

"Singlet oxygen trapper," ST, as used herein refers to a composition which reacts with the singlet oxygen, thereby removing it from the system.

"Derivative" as used herein refers to a composition derived from the stated composition. For example, a derivative of a porphyrin is a composition derived from the porphyrin.

Described herein is a method for overcoming oxygen inhibition of free radical polymerizations. The strategy involves the inclusion of two specially selected components in the reactive formulation: 1) a light-absorbing molecule which interacts with the ground state (triplet) oxygen to produce an excited (singlet) state of oxygen (the singlet oxygen generator) and 2) a second compound which reacts with the singlet oxygen, thereby removing the oxygen from the system (the singlet oxygen trapper).

The application of this strategy is very flexible since it allows the oxygen to be consumed either 1) before the polymerization is initiated (e.g., by a pre-illumination step using red or near-IR light) or 2) essentially simultaneously with the polymerizations (by essentially simultaneous illumination with one set of wavelengths that excite the singlet oxygen generator and a second set of wavelengths absorbed by the initiator).

This strategy can be used in conjunction with a free radical photoinitiator or thermal initiator and any free radical polymerizable monomer or oligomers. In addition, since this approach allows the oxygen to be consumed before the polymerization is begun, it can lead to an increase in the primary polymer chain length. This approach also provides flexibility in the design of the free radical polymerization process, since it allows the oxygen consumption and initiation to be decoupled.

Singlet Oxygen Generator

A variety of singlet oxygen generators (SG) can be used in the current invention. One singlet oxygen generator or more than one singlet oxygen generator can be used. The SG can be photoinduced or thermally induced, for example. The choice of singlet oxygen generator(s) is based on the following criteria.

The singlet oxygen generator(s) (SG) perform the following role in the free radical polymerization system (see Scheme I).

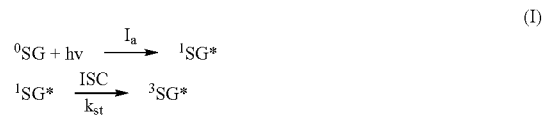

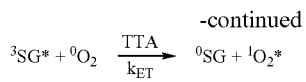

where:
SG = singlet oxygen generator (e.g., porphyrin)
$I_a$ = intensity of absorption
ISC = intersystem crossing
TTA = triplet-triplet annihilation The selection of singlet oxygen generator(s) depends, for example, on the photophysical properties of the composition. Normally, a "perfect" singlet oxygen generator should meet following criteria:
(a) the triplet excited state is sufficiently long-lived to encounter the dissolved oxygen during its lifetime; and
(b) the triplet state energy is higher than the 95 kJ/mol energy of singlet oxygen, e.g., about 100 kJ/mol.

These functional characteristics allow the singlet oxygen generator(s) to give efficient $^1O_2$ production without efficient back reaction.

The singlet oxygen generator(s) can have different light absorption spectra. Generally, the chosen generator(s) will produce singlet oxygen after absorbing photons in the red or the near infrared (IR) regions of the spectrum (i.e., different wavelengths than are typically used to initiate free radical photopolymerizations). Therefore, the generators can be used with either light-induced polymerization or thermally-induced polymerization systems.

The choice of singlet oxygen generator(s) is dependent on the free radical polymerization to be accomplished. If the polymerization is thermally-induced polymerization, the wavelength at which the singlet oxygen generator(s) is activated, or induced, is of less interest. If the polymerization is light-induced polymerization, the wavelength at which the singlet oxygen generator(s) is activated is much more important. A wavelength for the generator which is too close (i.e., overlaps with the absorption region of the photoinitiator) to the wavelength used for the light induction of the polymerization can lead to control issues due to unwanted initiation of the polymerization. Therefore, a generator is chosen for a given polymerization system which has a desired activation wavelength.

Examples of a photosensitizer for singlet oxygen production include a porphyrin, phythalocyanine, methylene blue, xanthene dye such as rose bengal, eosin Y, etc.

However, singlet oxygen generator(s) of the present invention only include those photosensitizers for singlet oxygen production which meet the definition above for "singlet oxygen generator": a light-absorbing composition which interacts with ground state (triplet) oxygen to produce an excited (singlet) state of oxygen but does not produce active centers by itself or by interaction with common initiators; a "singlet oxygen generator" of the invention also does not photobleach under conditions of the desired reactions.

Porphyrins and their derivatives are singlet oxygen generators useful in the present invention. Porphyrins—and other closely related tetrapyrrolic pigments—occur widely in nature, and they play very important roles in biological processes, such as the role played by heme.

The basic structure of a porphyrin is four pyrrole units linked by four methine bridges. The porphyrin macrocycle is an aromatic system. It obeys Huckel's rule of aromaticity (4n+2 pi electrons where n=2) and is planar. Porphyrins undergo a number of chemical reactions typical of aromatic compounds because of their highly conjugated structure, for example, electrophilic substitution reactions. The methine (meso) carbons and the beta-pyrrolic carbons participate in these reactions. In addition, porphyrins exhibit unique absorbance characteristics and photochemical properties. In the UV-visible absorption spectrum, the highly conjugated porphyrin macrocycle shows intense absorption (extinction coefficient>200,000) at around 400 nm (the Soret band), followed by several weaker absorptions (Q bands) at higher wavelengths (450–700 μnm).

Certain substituents on a porphyrin molecule can be modified. Variations of the peripheral substituents on the porphyrin ring often cause minor changes to the intensity and the wavelength of the absorptions. Another feature of porphyrins is the ability to be metalated and demetalated. A number of metals (e.g., Fe, Zn, Cu, Ni) can be inserted into the porphyrin cavity by using various metal salts and removed by treatment with acids of various strengths. Protonation of two of the inner nitrogen atoms or insertion of a metal into the porphyrin cavity also changes the visible absorption spectrum. The porphyrin ring is very stable to concentrated acids (e.g., sulfuric acid), and it itself can act as both an acid and a base.

The center ion of a metalloporphyrin is factor that will affect the ultimate efficiency of singlet oxygen production. The formation of the triplet state porphyrin is a prerequisite for the production of singlet oxygen. Previous studies showed that porphyrins containing paramagnetic transition metals cannot convert to the triplet state efficiently. Therefore, the diamagnetic metal cation such as aluminium (III), zinc (II), and tin (IV) are favored by this method, if a metalloporphyrin is used.

Porphyrins and their derivatives have been widely used in many applications, such as catalysis of multi-electron redox reactions, modeling of photosynthesis, and others. Their ability to produce singlet oxygen has been well established and documented. Porphyrins produce singlet oxygen through a well-known triplet-triplet annihilation process. After this first excited singlet state is populated by absorption, the porphyrins undergo intersystem crossing to the first excited triplet state. The quantum yield of singlet oxygen for different kinds of porphyrin is typically close to unity and can be directly obtained from published reports and papers. Quantum yield is important because it determines the efficiency of singlet oxygen production; higher quantum yield results in higher reaction rate between singlet oxygen and the singlet oxygen trapper (discussed below).

Although porphyrins have been used in many important chemical and biochemical processes (such as photodynamic therapy in medicine), their use in free radical polymerization systems has not been reported. Porphyrins and their derivatives have not been previously applied into free radical systems as an efficient photosensitizer to produce singlet oxygen.

Porphyrins have photochemical properties that make them well-suited for use in a system to eliminate oxygen inhibition in free radical polymerization. These properties include high singlet oxygen quantum yield and two absorption bands with a large energy gap. The unique absorption characteristics and photochemical properties described above make porphyrins and their derivatives effective for the current photochemical method to eliminate oxygen inhibition in free radical polymerizations.

The exact absorption spectrum of a given porphyrin will depend upon its chemical structure; however, porphyrins generally exhibit two absorption bands, as described above. The higher energy absorption band is in the near UV region (typically 400–430 μnm) and is called the Soret band. This absorption band corresponds to a transition from the ground single state, $S_0$, to the second excited singlet state, $S_2$. The second absorption band generally exhibited by porphyrins occurs at longer wavelengths and is called the Q band. This absorption band corresponds to a transition from the ground singlet state, $S_0$, to the first excited singlet state, $S_1$. The relative intensities of the Soret band and the Q band depend upon the chemical structure of the porphyrins. For example, in the case of phthalocyanine derivatives of porphyrins, the Q band absorption is generally higher than the Soret band, while many other classes of porphyrins exhibit a more intense Soret band. In any case, the $S_2$ state of all porphyrins and their derivatives is separated by a large energy gap from the lowest excited state ($S_1$). This large energy gap means that radiationless deactivation of the $S_2$ to the $S_1$ state is slow enough to allow competing processes to occur. The two absorption bands make it possible to achieve desired photochemical results through applying different wavelengths of incident light. Notably, it is the $S_1$ state that is responsible for singlet oxygen generation; therefore, the Q absorption may be used for photochemical elimination of oxygen. In addition, the $S_1$ state generally does not participate in electron transfer reactions with more organic molecules, while the $S_2$ state may participate in many more electron transfer reactions. This is significant since the higher energy $S_2$ absorption could be used to consume the porphyrin after the oxygen consumption is complete.

Further, porphyrins generally do not produce active centers, either by themselves or interacting with initiators. Therefore, the oxygen consumption reaction can be decoupled from the production of active centers. In addition, ground state porphyrins are regenerated after producing singlet oxygen and are very efficient at producing singlet oxygen; therefore, very small concentrations (relative to the concentrations needed if using photobleaching dyes photosensitizers, such as rose bengal and methylene blue) of these compounds can be used.

Figure 1:
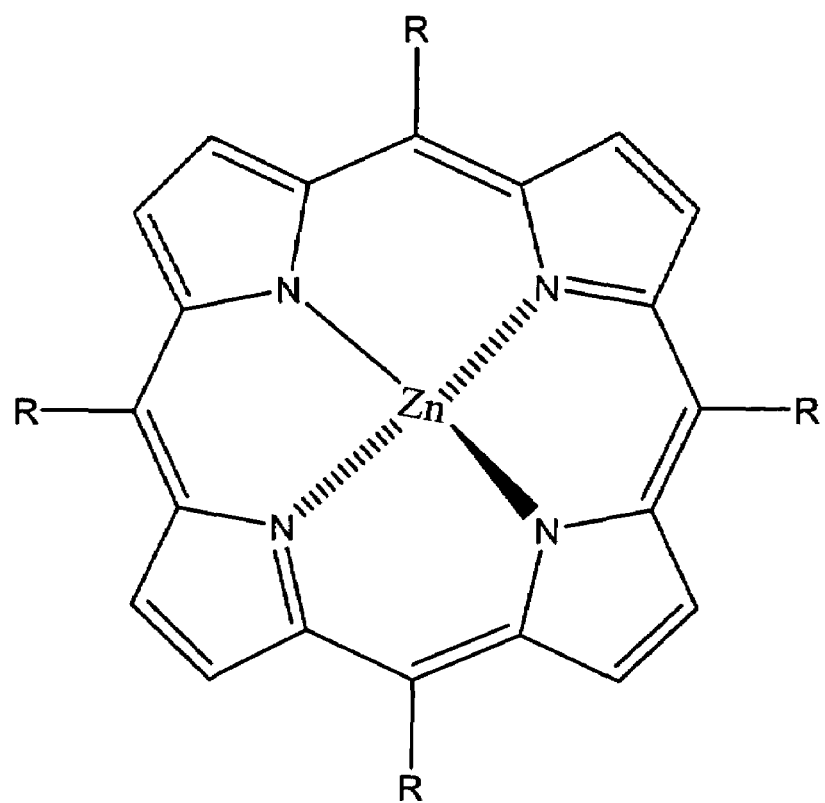
FIG. 1 shows 5,10,15,20-tetraphenyl-21H,23H-porphine zinc, synthetic.
Figure 1:
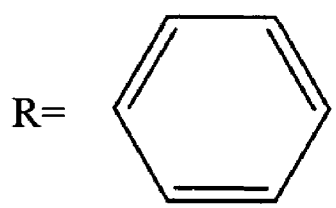
Figure 2:
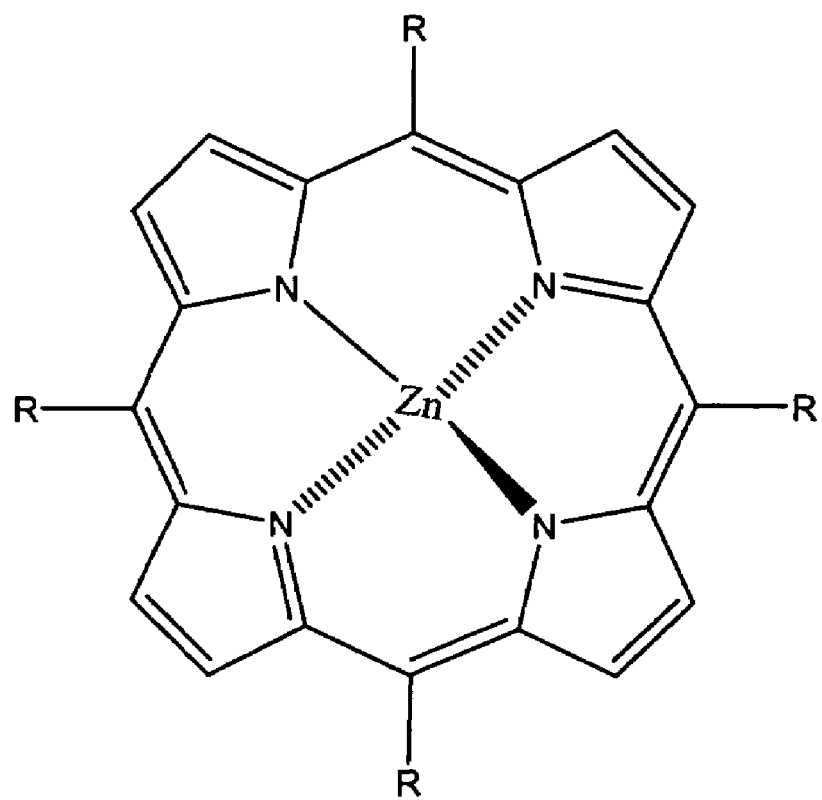
FIG. 2 shows zinc 5,10,15,20-tetra(4-pyridyl)-21H,23H-porphine.
Figure 2:
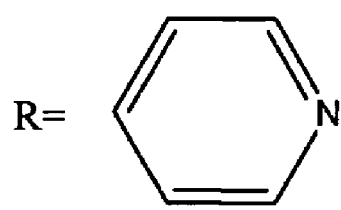
Figure 3:
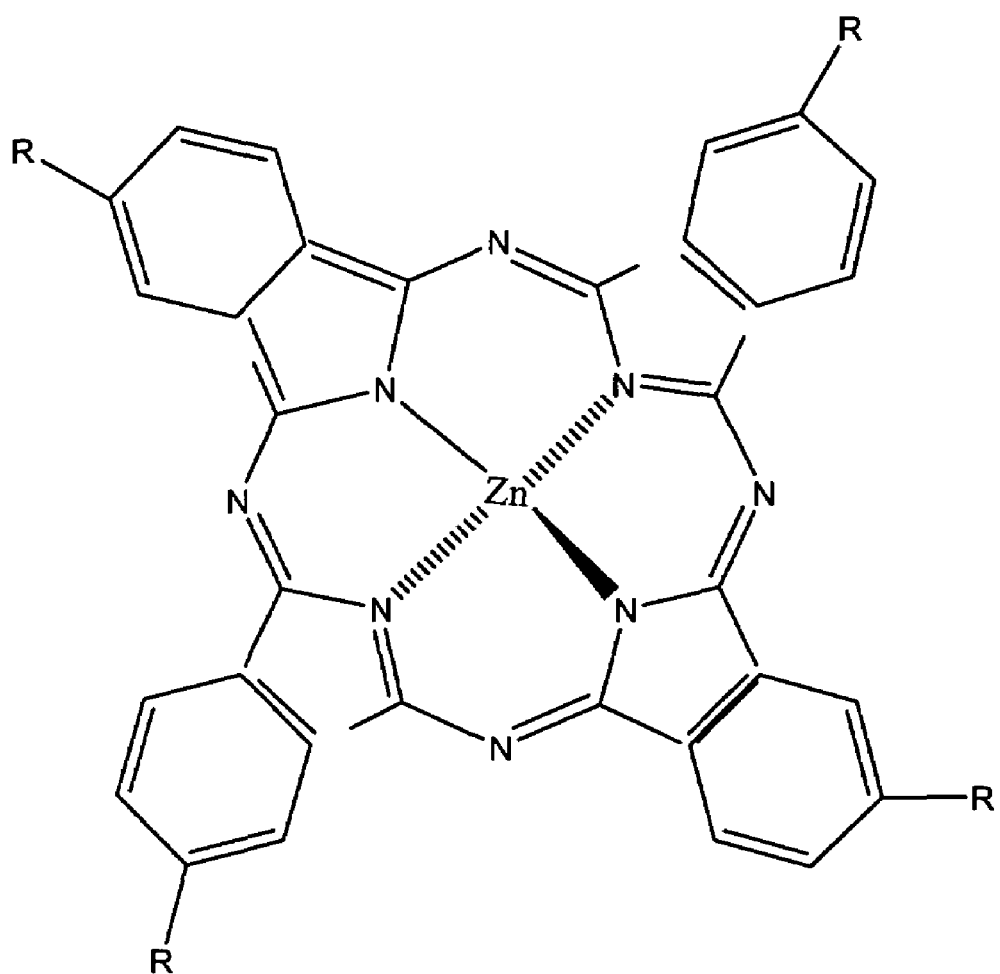
FIG. 3 shows zinc 2,9,16,23-tetra-tert-butyl-29H,31H-phthalocyanine (Zn-ttp).
Figure 3:
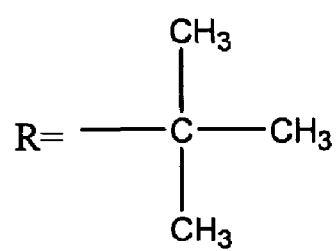

Examples of porphyrins that have been used as singlet oxygen generators in the current invention are shown in FIGS. 1–3: 5,10,15,20-tetraphenyl-21H,23H-porphine zinc, synthetic; zinc 5,10,15,20-tetra(4-pyridyl)-21H,23H-porphine; zinc 2,9,16,23-tetra-tert-butyl-29H,31H-phthalocyanine (Zn-ttp).

Porphyrins are commercially available or readily obtained or synthesized by methods known in the art. There are two general approaches to obtain a desired porphyrin:

1) modification of a naturally occurring porphyrin (e.g., heme) or 2) total synthesis.

Methods commonly used in porphyrin total synthesis are:
1) tetramerization of monopyrroles,
2) condensation of dipyrrolic intermediates,
3) cyclization of open chain tetrapyrroles, and
4) other methodologies.

One of skill in the art would be able to determine a particular singlet oxygen generator(s) to use in a particular application. Singlet oxygen generator(s) are commercially available or readily obtained or synthesized by methods known in the art.

The amount/concentration of singlet oxygen generator(s) added in the polymerization system is that which is sufficient to fulfill the purposes of the singlet oxygen generator(s) in the system. For example, a concentration of $2 \times 10^{-5}$ M has been used in a polymerization system. A concentration of singlet oxygen generator of $10^{-5}$ M~$5 \times 10^{-4}$ M can be used.

One of skill in the art would be able to determine the amount or concentration of a particular singlet oxygen generator(s) to use in a particular system.

Singlet Oxygen Trapper

A variety of singlet oxygen trappers (ST) can be used in the current invention. One singlet oxygen trapper or more than one singlet oxygen trapper can be used. The choice of singlet oxygen trapper(s) is based on criteria discussed below.

One of skill in the art would be able to determine a particular singlet oxygen trapper(s) to use in a particular application. Singlet oxygen trapper(s) are commercially available or readily obtained or synthesized by methods known in the art.

The amount/concentration of singlet oxygen trapper(s) added in the polymerization system is that which is sufficient to fulfill the purposes of the singlet oxygen trapper(s) in the system. For example, a concentration of 0.01 M has been used in a polymerization system. A concentration of singlet oxygen trapper of $10^{-2}$ M~$10^{-3}$ M can be used. One of skill in the art would be able to determine the amount or concentration of a particular singlet oxygen trapper(s) to use in a particular system.

The singlet oxygen trapper(s) (ST) performs the following role in a free radical polymerization system (see Scheme II).

(II)

where:
ST = singlet oxygen trapper
P = $O_2$-trapper product (e.g., peroxide product)

The singlet oxygen, $^1O_2^*$, comes from the reaction of the SG and the ground state oxygen as indicated above for the SG (Scheme I).

Singlet oxygen is more electrophilic than ground state oxygen and may participate in a variety of reactions with electron-rich compounds that are inactive to ground state oxygen. Reactions between singlet oxygen and an unsaturated organic compound are well-documented and have been applied to a wide range of chemical and biochemical processes.

Any compound that contains a carbon double bond has the potential to react with singlet oxygen. The rate of singlet oxygen addition to the double bond depends on a number of factors including 1) electron density of the double bond and 2) substituents attached to the carbon atoms (e.g., allylic hydrogen or electron donating groups are believed to be able to enhance the reaction rate). The three most common singlet oxygen reactions are: 1) [2+2] cycloaddition to electron-rich carbon double bonds to produce cyclic peroxides; 2) cycloaddition with 1,3-dienes and polynuclear aromatics to produce endoperoxides; and 3) "ene" reaction with a carbon double bond that has allylic hydrogen attached to it. In some cases the "ene" reaction and "[2+2] cycloaddition reaction" will occur simultaneously. The ratio of two competitive final products depends on the activity of the double bonds (electron rich C=C bonds that have substituted electron-donating group is favored by the [2+2]) and whether or not the alkene has an allylic hydrogen attached to it.

Selection of singlet oxygen trapper can be an important element in the invention because an efficient trapper can react with singlet oxygen rapidly.

A notable criterion for selection of singlet oxygen trapper is that the trapper(s) is stable in the system (the system is generally ~90% monomer/oligomer formulation). By "in the monomer" it is meant that the trapper is dissolved in the monomer.

STs that are unstable (such as diphenylisobenzofuran (DPBF)) react with the carbon double bond of the monomer. This is especially important because many compounds that will react with singlet oxygen to produce hydroperoxides will unfortunately also react with the double bonds of the free radically polymerizable monomer/oligomer units, and will, therefore, be consumed by the monomer/oligomer.

While this stability is a problem that has plagued this general approach in the past, the problem is solved by the present invention by finding compounds that are effective singlet oxygen trappers, but do not react with the monomer (s)/oligomers(s).

The first criterion for selection of a singlet oxygen trapper is that the rate of reaction between the singlet oxygen trapper(s) and singlet oxygen should be sufficiently high to allow the reaction to take place during the lifetime of the singlet oxygen (singlet oxygen lifetime in liquid phase is on the order of magnitude of $10^{-3}$ sec.). Some classes of organic compounds that exhibit high reaction rates with singlet oxygen are, for example, enamines, polynuclear aromatics, pyrroles, furans, and alkenes containing one or more allylic hydrogens. However, not all compounds that will react with singlet oxygen are appropriate for this invention due to other considerations and limitations noted below.

The general criteria applied to identify appropriate singlet oxygen trapper(s) are listed below:

1) the reaction rate between singlet oxygen and the singlet oxygen trapper(s) must be fast enough (i.e., during the lifetime of the singlet oxygen) (note that the reaction rate depends upon both the rate constant for the reaction and the concentration of the singlet oxygen trapper);

2) the singlet oxygen trapper(s) does not react with the ground state (triplet) oxygen since 3) the singlet oxygen trapper(s) must be stable in air-saturated (or, more broadly, molecular oxygen-containing) monomer/oligomer (this criterion eliminates many potential singlet oxygen trappers since many compounds that react with singlet oxygen also react with the carbon double bonds of a monomer/oligomer).

A compound such as diphenylisobenzofuran (DPBF) meets the first criterion for a singlet oxygen trapper (is a singlet oxygen acceptor), but does not meet the second and third criteria because it will react with the ground state oxygen and will react with most acrylic monomers. Therefore, DPBF is not appropriate for a singlet oxygen trapper of the current system.

Four example compounds that do meet all three of these criteria are:

9,10-dimethylanthracene (DMA),
9,10-diphenylanthracene,
N,N,2-trimethylpropenylamine,
6-(dimethylamino)fulvene.

DMA, for example, has been used successfully in a polymerization system.

Other singlet oxygen trappers can be characterized from, for example, the classes of compounds enamines, polynuclear aromatics, pyrroles, furans, imidazles, tetrasubstituted olefins, and alkenes containing one or more allylic hydrogens. One of skill in the art can determine those compounds which meet the three criteria for STs.

In general, reaction of the singlet oxygen trappers with the singlet oxygen results in the production of hydroperoxides, endoperoxides, or dioxetanes. For example, DMA results in the production of an endoperoxide, while alkenes containing allylic hydrogens result in the production of hydroperoxides. It is interesting to note that once the hydroperoxide or endoperoxide is formed, it can be decomposed by heat, light, or by reaction with a third component to produce free radicals. In that case, the presence of the oxygen in the system actually leads to the production of free radical active centers thus inducing another round of propagations.

Monomer/Oligomer

A monomer or oligomers of the invention can be any free radically polymerizable monomer or oligomer. A free radically polymerizable monomer/oligomer is one which will undergo free radical polymerization. One or more than one free radically polymerizable monomer/oligomer can be used. One of skill in the art is able to determine which monomer(s)/oligomers(s) to use for a desired polymer.

Essentially any monomer/oligomer that undergoes free radical polymerization can be used. In general, these monomers/oligomers contain a carbon double bond. Some classes of monomer/oligomer that undergo free radical polymerizations include acrylates, methacrylates, styrene, α-methyl styrene, 1,3-dienes, halogenated olefins, vinyl esters, acrylonitrile, methacrylonitrile, acrylamide, and methacrylamide.

One such monomer is an acrylate monomer, specifically a methacrylate monomer, for example, 2-hydroxyethylmethacrylate (HEMA).

Free radically polymerizable monomers/oligomers are commercially available or readily obtained by methods known in the art.

The amount/concentration of free radically polymerizable monomer/oligomer added in the polymerization system is that which is sufficient to fulfill the purposes of the free radically polymerizable monomer/oligomer in the system. One of skill in the art would be able to determine the amount or concentration of a particular free radically polymerizable monomer/oligomer to use in a particular system for the desired polymer.

Initiator

Since the current method(s) allow oxygen consumption and polymerization to be decoupled, the system can work with any free radical initiator system. The system can work with a free radical photoinitiator or a free radical thermal initiator.

An example of a free radical initiator system is an α-cleavage system (these are the most common type of initiator; there are probably over 100 commercial α-cleavage initiators available). Some exemplary classes of α-cleavage initiators include benzyl dimethyl ketal derivatives (such as the 2,2-dimethoxy-2-phenylacetophenone (DMPA)), benzoin ethers, hydroxyalkyl phenyl ketones, benzoyl cyclohexanol, trimethyl benzoyl phosphine oxide, methyl thiophenyl morpholinoketones, and morpholino phenyl amine ketones.

The method can work in a 2-component (hydrogen abstraction) or 3-component system as well. However, the processes involved might be complicated by the multicomponent system.

Most free radical polymerizations are carried out in the air and hence are subject to oxygen inhibition. Therefore, the impact of this invention will be far reaching. It could be applied to coating and paint industries, adhesives, optics, dental filling, sealing compound, stereo-lithography and many others. The utility of the invention is not confined to these specific applications. The potential field of applications includes almost all the industrial processes that involve the free radical mechanism.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Examples 1–4

Zn-ttp and DMA present in Oxygen-saturated Monomer—Example 1

Zn-ttp and DMA present in Argon-purged (Oxygen-depleted) Monomer—Example 2

Zn-ttp alone in Oxygen-saturated Monomer—Example 3

DMA alone in Oxygen-saturated Monomer—Example 4

No initiator

Materials/Methods

Singlet Oxygen Generator/Trapper

A series of experiments (Exs. 1–4) were performed using zinc 2,9,16,23-tetra-tert-butyl-29H,31H-phthalocyanine (Zn-ttp) as the singlet oxygen generator and 9,10-dimethylanthracene (DMA) as the singlet oxygen trapper.

When Zn-ttp was present in the system, its concentration was $2.0 \times 10^{-5}$M, while a DMA concentration of 0.01M was used for the samples containing DMA. Concentrations are the final concentrations in the samples.

Monomer/Initiator

A series of photochemical experiments were performed with both components (singlet oxygen generator and singlet oxygen trapper) present in (dissolved in) a monomer, 2-hydroxyethylmethacrylate (HEMA), without the presence of an initiator.

Theses studies were performed to demonstrate the ability of the Zn-ttp and DMA to produce and react with singlet oxygen, respectively. In addition, these studies illustrate these two components do not lead to the production of active centers (since no polymerization takes place).

In these studies, the UV-visible absorption spectrum of the DMA singlet oxygen trapper was monitored as a function of time to follow the change in concentration as the reaction with singlet oxygen takes place.

For each experiment, the absorption of the solution was recorded from a sealed cuvette which contained a fixed amount of sample (2.5 ml).

The cuvette was then irradiated by 670 nm light (this wavelength corresponds to the $S_1$ absorption of the photosensitizer and is not absorbed by the DMA) for 10 seconds, and absorption spectra was collected again. The measurement was repeated 10–20 times until the absorption of singlet oxygen trapper became stable.

The concentration of different light absorbing species in the system were chosen so that no saturated UV-Vis spectra would result and both singlet oxygen generator (porphyrin) and trapper (DMA) could be clearly defined and easily observed in a overlaid absorption spectra of the solution (containing generator and trapper).

Results

The experimental results revealed that the DMA concentration decreased with time only for the experiment in which both Zn-ttp and DMA were present in the oxygen-saturated monomer.

The sample containing both Zn-ttp and DMA in the argon-purged (oxygen-depleted) monomer exhibited a DMA absorbance that did not change with time.

These results illustrate clearly that oxygen must be present for the DMA to be consumed upon illumination with 670 nm light.

In addition, no change in the DMA concentration was observed for the samples containing only Zn-ttp or only DMA.

Together, these results suggest that oxygen plays a key role in the consumption of DMA upon illumination with light absorbed by Zn-ttp.

For systems containing all three compounds: oxygen, Zn-ttp, and DMA, absorption of light by Zn-ttp resulted in the consumption of DMA. If any one of these three components is missing, there is no change in DMA concentration upon illumination with 670 nm light.

These results are consistent with the reaction scheme shown below in (III) in which Zn-ttp produces singlet oxygen, and DMA reacts with the singlet oxygen to produce an endoperoxide.

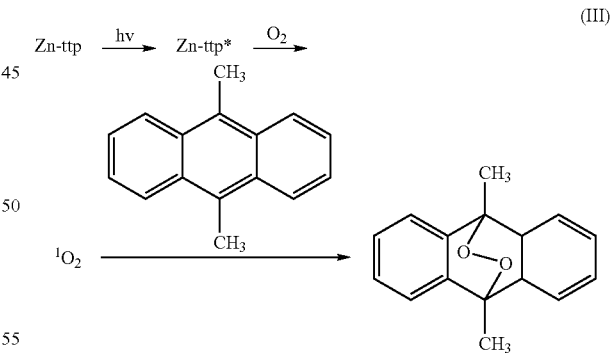

(III)

Example 5

Free Radical Polymerization Studies

Air Atmosphere

A series of free radical polymerization studies were performed to demonstrate that the photochemical method for eliminating oxygen inhibition in free radical polymerizations results in an enhanced polymerization rate for polymerizations carried out in an oxygen atmosphere.

Materials/Methods

These studies were carried out using

| | |
|---|---|
| Singlet oxygen generator | Zn-ttp |
| Singlet oxygen trapper | DMA |
| Free radically polymerizable monomer | HEMA |
| Free radical photoinitiator | 2,2-dimethoxy-2-phenylacetophenone (DMPA) |

The polymerization reaction rate as a function of time was determined using in situ differential scanning calorimetry to measure the rate at which heat is released from the sample as a function of time. The rate at which heat is released from the sample is directly proportional to the polymerization rate since the polymerization reaction is exothermic.

To demonstrate the effect of the photochemical consumption of the oxygen on the free radical polymerization kinetics, the samples were subject to illumination with 670 nm light from a diode laser prior to illumination with UV light. This 670 nm illumination resulted in consumption of the oxygen according to the reaction scheme shown above (III) (it is important to note that only Zn-ttp absorbs light at this wavelength). Comparison of the reaction kinetics observed for a sample subject to this 670 nm illumination to an identical sample (with the same concentrations of all reactants) which had no 670 illumination illustrated the effect of oxygen consumption on the polymerization rate.

The samples were illuminated with light from a 200W Xe—Hg arc lamp at time zero to initiate the photopolymerization.

Preliminary studies confirmed that the 670 nm pre-illumination did not lead to the production of free radical active centers.

Results

Figure 4:
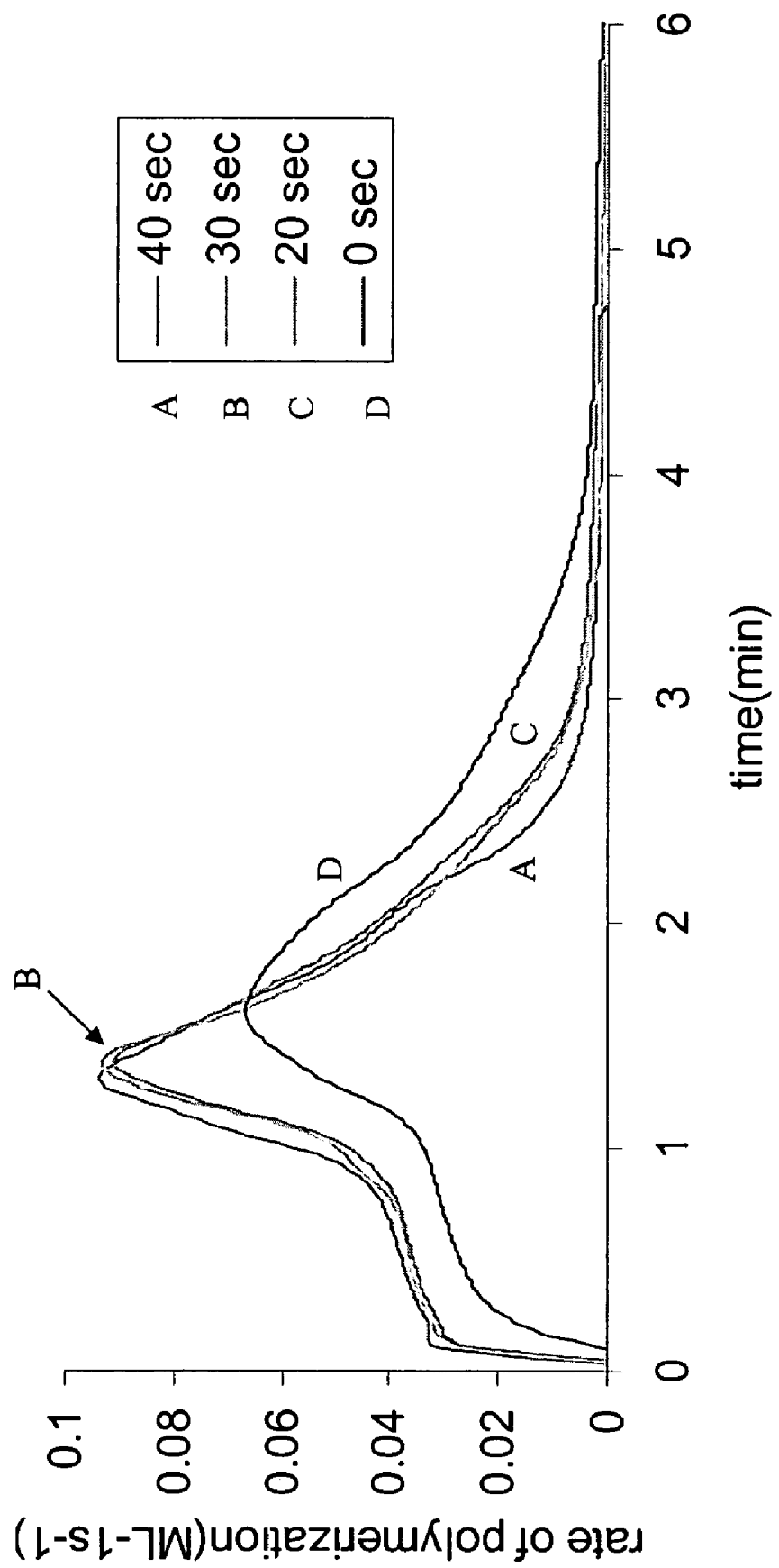
FIG. 4 illustrates the polymerization rate as a function of time for HEMA polymerization carried out in air for samples containing 0.05M 2,2-dimethoxy-2-phenylacetophenone (DMPA) photoinitiator, $2.0 \times 10^{-5}$M Zn-ttp, and $4.72 \times 10^{-3}$M 9,10-dimethylanthracene (DMA) (Example 5). The samples were pre-illuminated with 670 nm light from a diode laser ($32.72$ nM/cm$^2$) before illumination with a Xe—Hg lamp (60 mW/cm$^2$) at time zero.

FIG. 4 illustrates the effect of the 670 nm illumination on the free radical polymerization reaction kinetics. The figure illustrates that there is a dramatic increase in the observed polymerization rate and decrease in the inhibition period as a result of the 670 nm illumination. This enhancement in the polymerization rates was observed only if Zn-ttp and DMA were both present in the reaction system. These results indicate that the observed enhancement in the polymerization rate and reduction in the inhibition time resulted from the photochemical consumption of the oxygen in the reaction system.

Example 6

Free Radical Polymerization Studies

Nitrogen atmosphere

These studies were performed under the same procedure as those shown in Example 5 with the exception of the use of nitrogen inerting in Example 6.

Results

Figure 5:
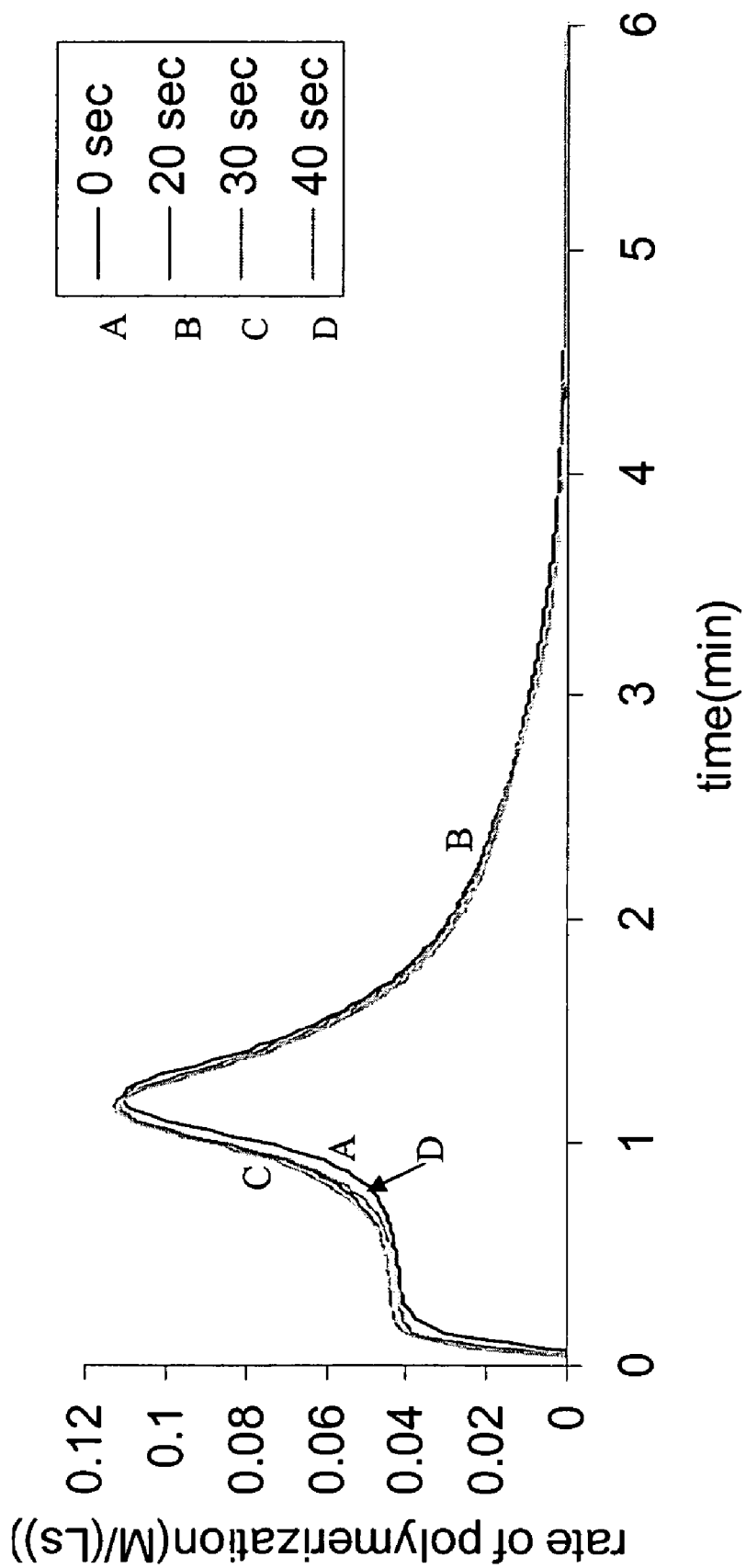
FIG. 5 illustrates the polymerization rate as a function of time for HEMA polymerizations carried out in a nitrogen atmosphere for samples containing 0.05M DMPA photoinitiator, $2.0 \times 10^{-5}$M Zn-ttp, and $4.72 \times 10^{-3}$M DMA. The samples were pre-illuminated with 670 nm light from a diode laser ($32.72$ nM/cm$^2$) before illumination with a Xe—Hg lamp (60 mW/cm$^2$) at time zero.

Experimental results for experiments carried out in a nitrogen atmosphere are shown in FIG. 5.

Note that, although the 670 nm pre-illumination has a marked effect for the system without nitrogen inerting (FIG. 4), for the sample with nitrogen purging, the 670 nm pre-illumination has essentially no impact on the photopolymerization rate (FIG. 5).

This result supported the hypothesis that the 670 nm illumination leads to consumption of the oxygen since there is no enhancement in rate if there was no oxygen to be consumed.

It is also interesting to note that the samples in FIG. 4 that were subject to the 670 nm pre-illumination exhibit reaction rate characteristics that are similar to those for the nitrogen inerted cases shown in FIG. 5 (in fact, they fall much closer to the nitrogen inerted rate profiles than the non-inerted case with no 670 nm pre-illumination).

The studies of Examples 1–6 demonstrate that the photochemical method for eliminating oxygen inhibition in free radical polymerization does result in an enhanced polymerization rate for free radical polymerizations carried out in an oxygen atmosphere.

All of the results are consistent with the porphyrin serving as an efficient singlet oxygen generator and DMA serving as a singlet oxygen trapper.

Example 7

Comparison of the Singlet Oxygen Generation Capabilities of Porphyrins to Organic Dyes This example describes experiments that were performed to, compare the singlet oxygen generation capabilities of porphyrins to the singlet oxygen generation capabilities of two organic dyes, including the dye Decker used in his studies (see BACKGROUND, Decker et al., 1979 and Decker, 1979). The experiments illustrate that the Zn-ttp is considerably more effective in generating singlet oxygen than the two organic dyes.

Characterization of the Singlet Oxygen Quantum Yield

A series of studies were completed to compare the quantum yield of singlet oxygen generation for Zn-ttp (a porphyrin), and for two organic dyes: rose bengal (RB), and methylene blue (MB). The singlet oxygen quantum yield is an important criterion for choice of a singlet oxygen generator. The singlet oxygen quantum yield is generally defined as the number of singlet oxygen molecules produced per photon of light absorbed.

| | |
|---|---|
| SG | $5 \times 10^{-5}$ M rose bengal |
| | $1 \times 10^{-5}$ M methylene blue |
| | $1.5 \times 10^{-5}$ M Zn-tpp |
| ST | $2 \times 10^{-4}$ M DMA |
| Solvent | HEMA |

In this case, the generation of singlet oxygen was characterized by monitoring the concentration of dimethylanthracene (DMA). Studies with Zn-ttp were completed previously and are disclosed above (Exs. 1–6), therefore only the studies with the two organic dyes are presented below.

Experiments were performed under the following four sets of conditions:
1) Methylene blue (or rose bengal) and DMA present in the air-saturated monomer;
2) Methylene blue (or rose bengal) and DMA present in the argon-purged (oxygen-depleted) monomer;
3) Identical samples containing same components irradiated with light of different wavelength; and 4) Organic dye, DMA, and DABCO present in the air-saturated monomer.

The results of the first two experiments are compared with porphyrin-sensitized system. For the fourth class of experiments, the presence of DABCO in the system leads to the inhibition of the reaction between singlet oxygen and the trapper. DABCO is well known for the physical quenching of the singlet oxygen and is capable of returning it to its ground state without undergo any chemical change. Therefore, it is a strong proof that singlet oxygen has been produced if the decay rate of DMA is reduced pronouncedly with the addition of DABCO.

For each experiment, the absorption of the solution was recorded from a sealed cuvette which contained a fixed amount of sample (2.5 ml). Then, the cuvette was irradiated by a Spectrum Illuminator for 10 sec (the wavelength has been adjusted to overlay with the $S_1$ absorption of the photosensitizer), and absorption spectrum was collected again. The sample was constantly stirred during the process of irradiation to maintain a homogeneous concentration. The measurement was repeated 20–30 times until the absorption of singlet oxygen trapper became stable.

Results

Figure 6:
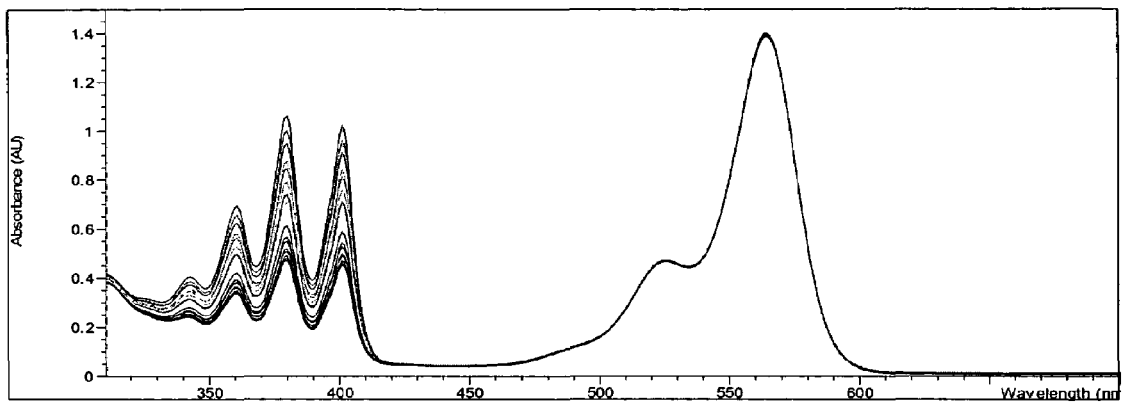
FIG. 6 is a comparison of overlaid spectra for air-saturated and argon-saturated sample from Example 7. Singlet oxygen generator (SG): $5 \times 10^{-5}$ M rose bengal; Singlet oxygen trapper (ST): $2 \times 10^{-4}$ M DMA; Solvent: HEMA. Light source: 564 nm spectrum illuminator. a. Overlaid spectra of the air-saturated sample containing rose bengal and DMA for the increasing irradiation time. b. Overlaid spectra of the argon-purged sample containing rose bengal and DMA for the increasing irradiation time.
Figure 6:
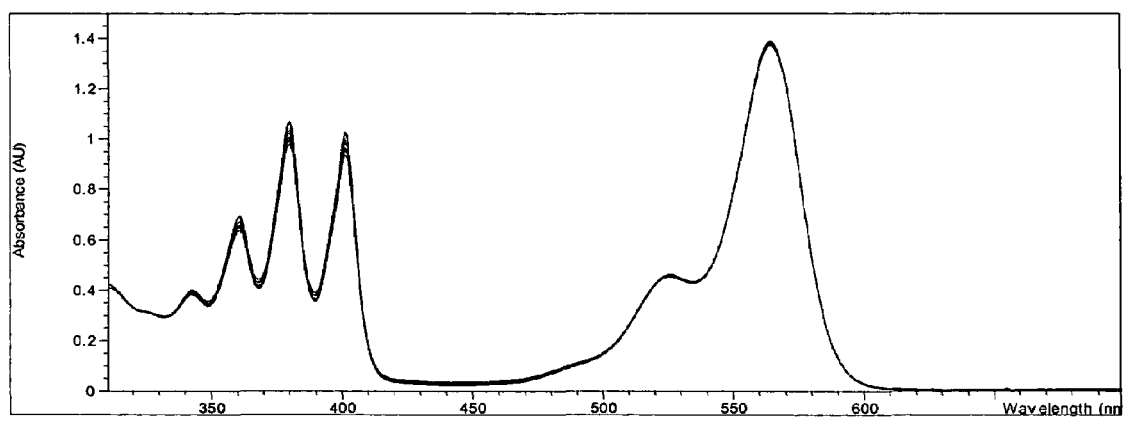
Figure 7:
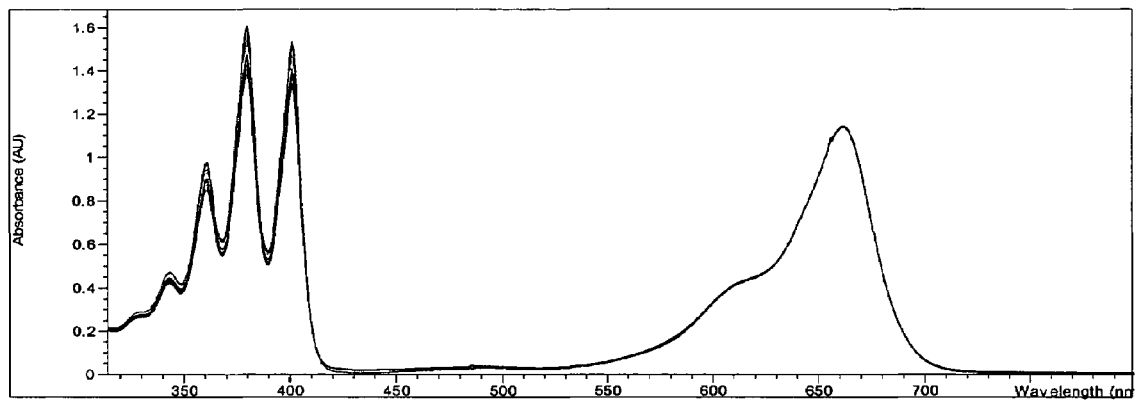
FIG. 7 is a comparison of overlaid spectra for air-saturated and argon-saturated sample from Example 7. Singlet oxygen generator (SG): $1 \times 10^{-5}$ M methylene blue; Singlet oxygen trapper (ST): $2 \times 10^{-4}$ M DMA; Solvent: HEMA. Light source: 672 nm spectrum illuminator. a. Overlaid spectra of the air-saturated sample containing methylene blue and DMA for the increasing irradiation time. b. Overlaid spectra of the argon-purged sample containing methylene blue and DMA for the increasing irradiation time.
Figure 7:
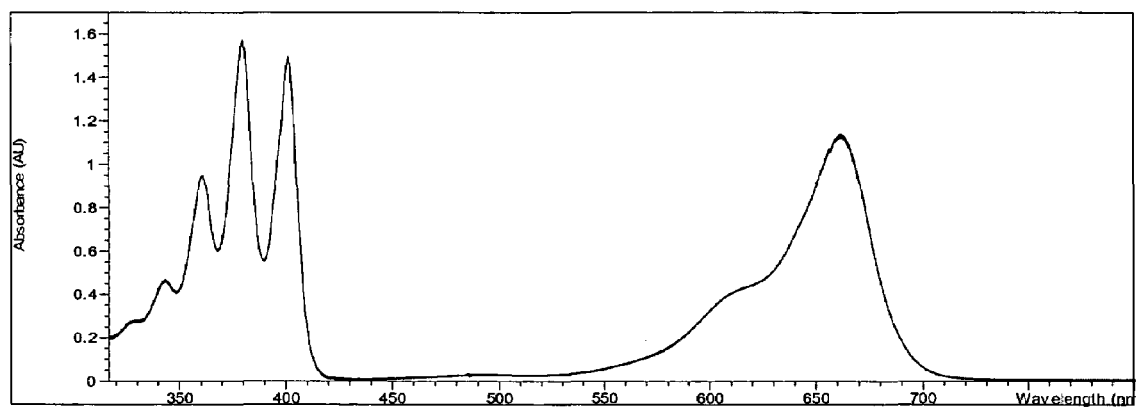
Figure 8:
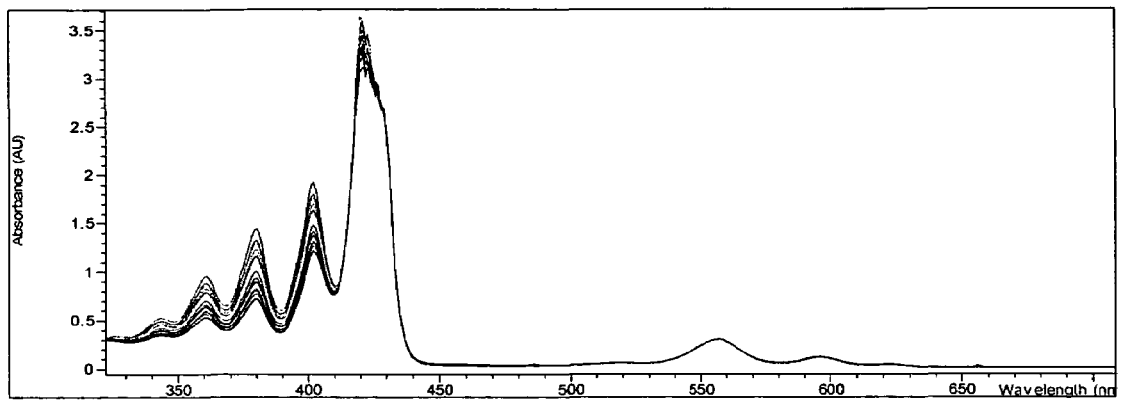
FIG. 8 is a comparison of overlaid spectra for air-saturated and argon-saturated sample from Example 7. Singlet oxygen generator (SG): $1.5 \times 10^{-5}$ M Zn-tpp; Singlet oxygen trapper (ST): $2 \times 10^{-4}$ M DMA; Solvent: HEMA. Light source: 557 nm spectrum illuminator. a. Overlaid spectra of the air-saturated sample containing Zn-tpp and DMA for the increasing irradiation time. b. Overlaid spectra of the argon-purged sample containing Zn-tpp and DMA for the increasing irradiation time. c. Absorption decay of DMA recorded at 380 nm.
Figure 8:
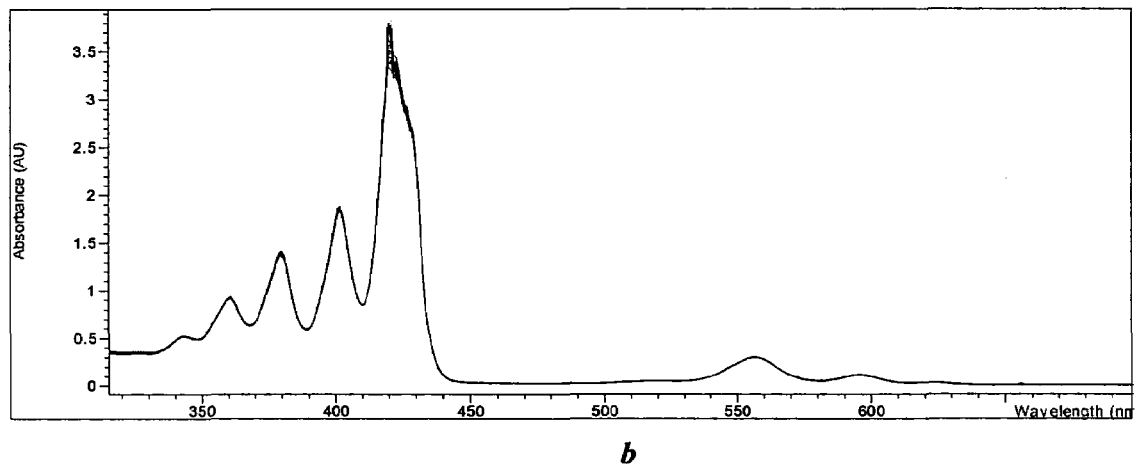
Figure 8:
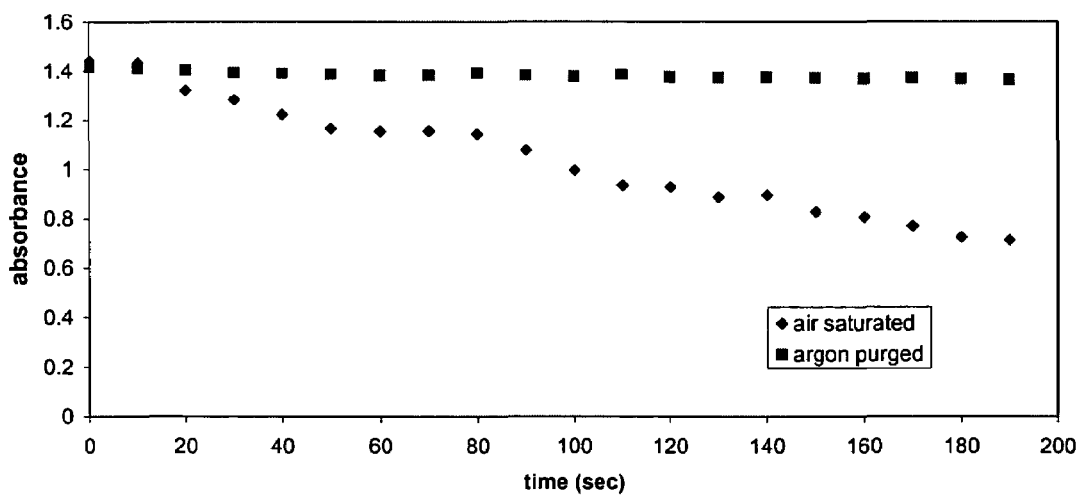

See FIG. 6 for the results with rose bengal.
See FIG. 7 for the results with methylene blue.
See FIG. 8 for the results with Zn-tpp.
See FIG. 9 for the effect of wavelength on DMA decay using Zn-tpp as the SG.
See FIG. 10 for the effect of DABCO on absorption decay of DMA using rose bengal as the SG.

The experimental results revealed that other organic dyes such as methylene blue and rose bengal can also photosensitize the decomposition of DMA in the presence of oxygen, but that the quantum yield is significantly lower than the porphyrins. The three photosensitizers (porphyrin, MB, RB) tested are well known for the production of singlet oxygen. A generalized form of the overall photochemical process is shown below:

$$^0SG + h\nu \xrightarrow{I_a} {}^1SG^*$$
$$^1SG^* \xrightarrow[k_{st}]{ISC} {}^3SG^*$$
$$^3SG^* + {}^0O_2 \xrightarrow[k_{ET}]{TTA} {}^0SG + {}^1O_2^*$$
$$^1O_2^* + ST \xrightarrow{k_q} P$$

where:
SG=singlet oxygen generator (porphyrin)
ST=singlet oxygen trapper
$I_a$=intensity of absorption
ISC=intersystem crossing
TTA=triplet-triplet annihilation
P=peroxide product Note: the competing processes (such as fluorescence, radiationless decay etc.) are not listed in this mechanism.

The quantum yield of the final product for a particular organic dye can be expressed as:

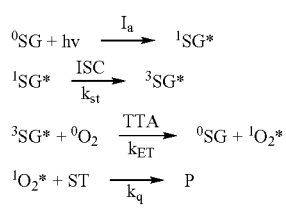

$$\Phi_p = -\frac{c_t - c_0}{\frac{I_a}{V} \times t} \quad (1)$$

-continued $$\text{Where: } I_a = (1 - 10^{-abs}) \times \frac{A \times I_0}{N_A} \quad (2)$$

Here, $c_0$ and $c_t$ are the concentration of singlet oxygen trapper prior to and after irradiation; V is the volume of the sample; A is the irradiated area; $I_0$ is the light intensity; abs is the absorbance of the singlet oxygen generator (porphyrin) at irradiation wavelength; and $N_A$ is Avogadro's constant.

And the singlet oxygen quantum yield ($\Phi_\Delta$) can be expressed as:

$$\frac{1}{\Phi_p} = \frac{1}{\Phi_\Delta} + \frac{1}{\Phi_\Delta} \cdot \frac{k_d}{k_a} \cdot \frac{1}{[DMA]} \quad (3)$$

where: $k_d$ represents the $_1O_2$ relaxation rate constant in solvent and $k_a$ represents the rate constant of reaction between $^1O_2$ and the trapper (DMA). (Spiller W, Kliesch H, Wohrle D, et al. J Porphyr Phthalocya 2 (2): 145–158 Mar-April 1998)

Combining the equations (1) and (2), we can compare the $\Phi_\Delta$ of two singlet oxygen generators:

$$\frac{\Phi_{p1}}{\Phi_{p2}} = \frac{\Delta c_1}{\Delta c_2} \times \frac{(1 - 10^{-abs2})I_{02}}{(1 - 10^{-abs1})I_{01}} = \frac{\Phi_{\Delta_1}}{\Phi_{\Delta_1}} \quad (4)$$

From the above equation and the DMA decay experiment result, the ratio of final product quantum yield of the different photosensitizers were calculated. The result shows that the ratio of the $\Phi_\Delta$ for Zn-tpp, RB, and MB was 1:0.3:0.2. Therefore, the Zn-ttp porphyrin was more than three times more effective that the rose bengal, and five time more effective than the methylene blue.

Investigation of Different Absorption Regions for Zn-tpp

Another series of experiment was carried out to study the effect of different illumination wavelengths (which are absorbed by Zn-tpp) on the DMA absorption decay.

For a series of three experiments, the emission band of the spectrum illuminator was set at 557 nm, 422 nm and 495 nm, respectively (therefore, the illumination was centered at these values, with a bandwidth of 20 nm). These wavelengths correspond to the Q band ($S_0 \rightarrow S_1$ transition, 557 μnm), S band ($S_0 \rightarrow S_2$ transition, 422 nm), and non-absorption region of porphyrins (495 nm).

Figure 9:
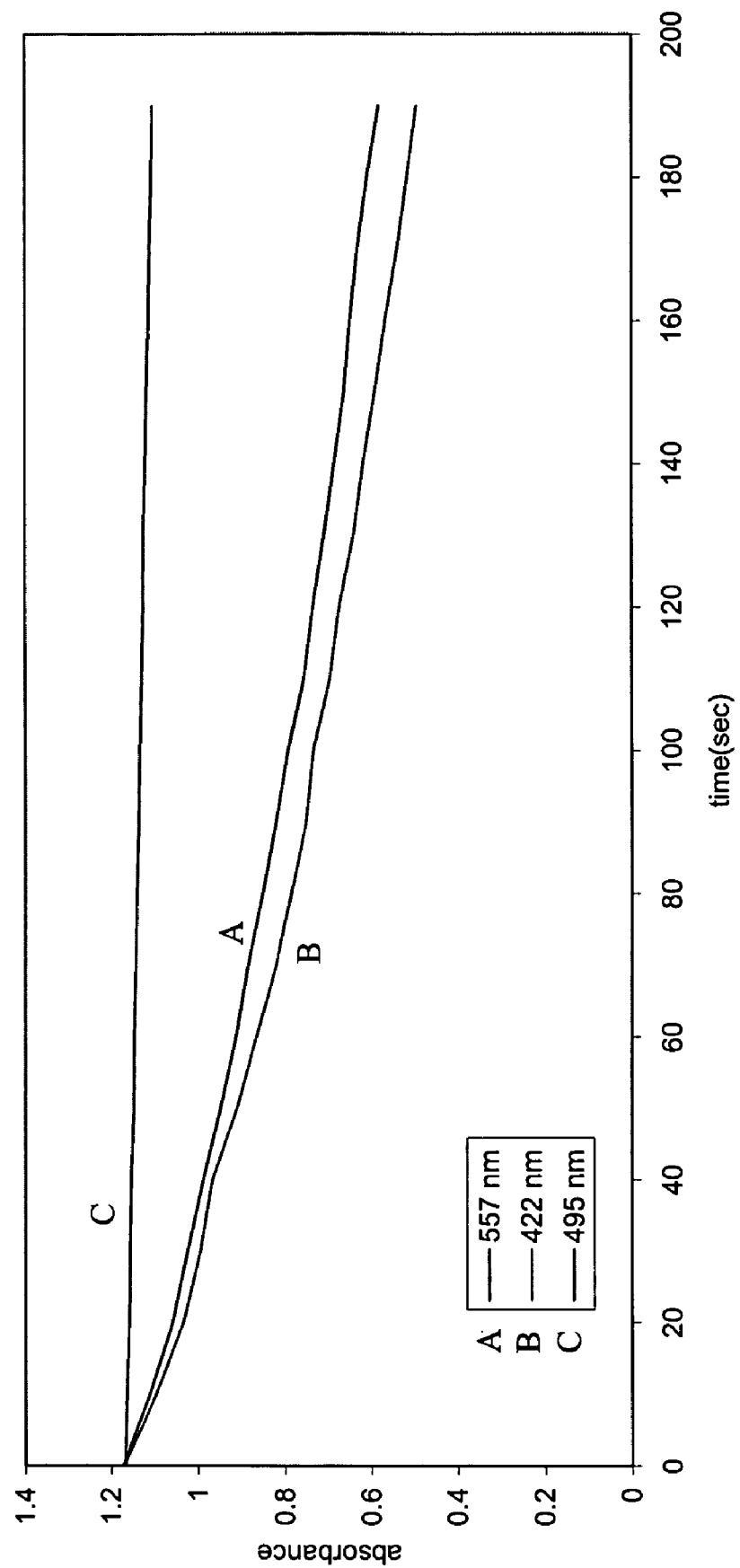
FIG. 9 demonstrates the effect of different wavelengths on the DMA decay from Example 7. SG: $1.5 \times 10^{-5}$ M Zn-tpp.

The result show in FIG. 9 clearly indicated that the singlet oxygen-involved process during the irradiation is largely dependent on the illumination wavelength. For the non-absorption region (495±10 nm), the decay rate of DMA is very slow. (The slight decay may due to the two small emissions around 430 and 547 nm leaked from the optical window chosen). However, in the case of 557 nm and 422 nm irradiation, DMA absorption decayed rapidly. This result showed that the excited state of the photosensitizer is a requisite for the reaction between DMA and singlet oxygen. The results also illustrated that the 422 nm illumination (which corresponds to the $S_2$ state) leads to a slightly more rapid DMA decay than the 557 nm illumination (which corresponds to the $S_1$ state). However, if we account for the fact that $S_2$ absorption is much more intense than the $S_1$ absorption, and the emission of the spectrum illuminator at 422 is much more intense than its emission at 557 nm, it is obvious that $S_1$ state has the higher quantum yield for singlet oxygen. (According to equation 3, the quantum yield for $S_1$ state is 20 times higher than $S_2$ state).

The first singlet excited state of the porphyrin is the only state that will lead to the formation of the first triplet excited state. In other words, the intersystem crossing (ISC) will only happen between the $S_1$ and $T_1$ state. Higher excited states ($S_2$, $S_3$ ...) may convert to triplet state through the intramolecular electronic relaxation to the lowest singlet state. However, the large energy gap between $S_1$ and $S_2$ state as well as the paralleled energy surface of the two states retard the internal conversion from $S_2$ to $S_1$ state. Consequently, the chance for the radiative deactivation (fluorescence) from $S_2$ state and other competing process (such as electron transfer reaction with other compound) is largely increased. Therefore, the first singlet state of Zn-tpp is more efficient to form the triplet excited state and generate singlet oxygen.

In practice, it is best to choose Q band ($S_1$ absorption) as the irradiation wavelength because:

1) The Q band of most porphyrins are in near IR region, which is far beyond the absorption band of photoinitiator;
2) The probability of electron transfer reactions and other competing processes is increased for the higher energy singlet state ($S_2$);
3) The Q band has higher singlet oxygen quantum yield;
4) The deficiency of Q band absorption for porphyrin can be overcome by employing phthalocyanine, which has intense Q band absorption and high quantum yield of singlet oxygen.

The DMA Decay in the Presence of DABCO

Figure 10:
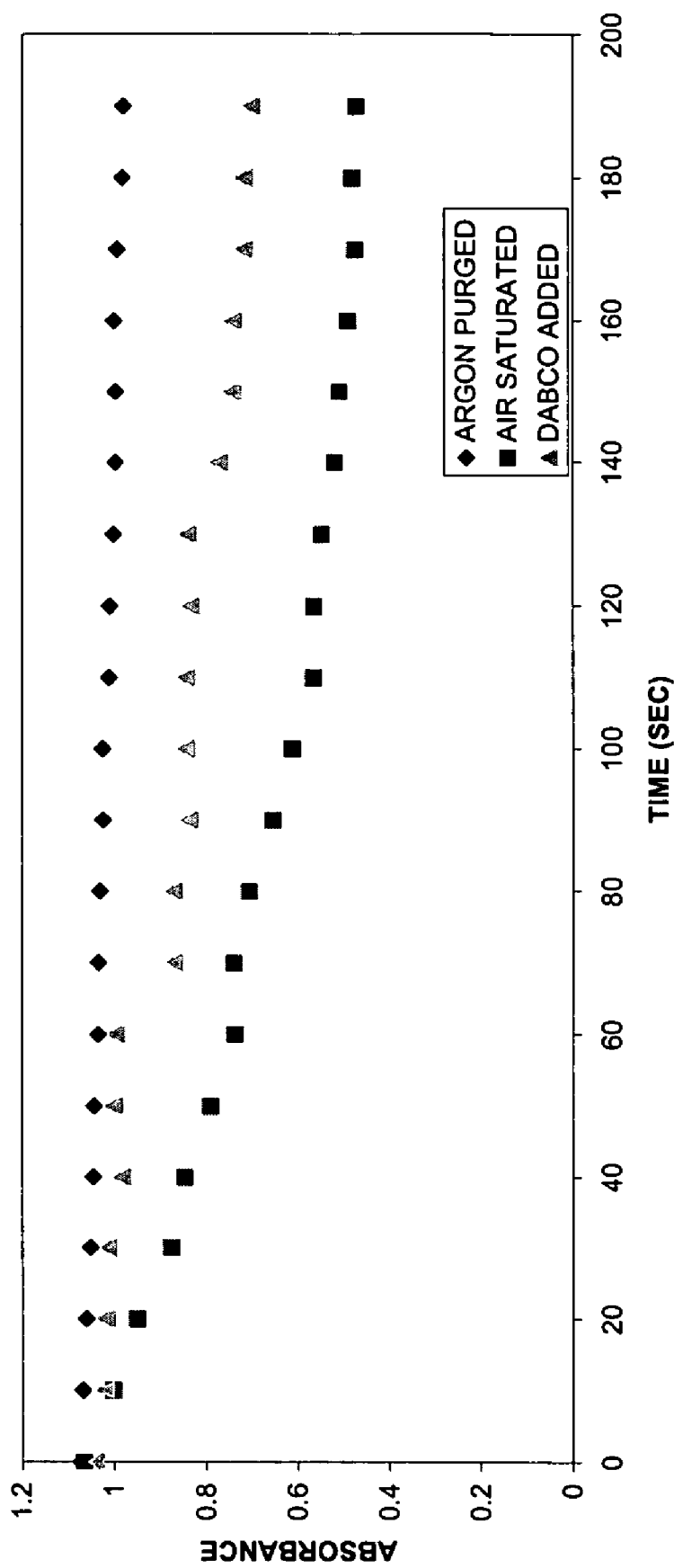
FIG. 10 is the effect of 1,4-diazobicyclo[2,2,2]-octane (DABCO) on the absorption decay of DMA from Example 7. SG: $5 \times 10^{-5}$ M rose bengal.

The experiment result of a sample containing DABCO is shown in FIG. 10. The decay rate of DMA is markedly reduced in the presence of DABCO, which is consistent with the proposed mechanism. The addition of DMA induced an efficient quencher of singlet oxygen in the system, therefore dramatically inhibited the reaction between DMA and singlet oxygen.

The Range of Concentration for Different Component

The concentration for the singlet oxygen generator and trapper in the photoinitiation system determines the ultimate effectiveness of this method. To achieve the prompt elimination of oxygen, it is necessary to increase the concentration of generator and trapper to a maximum extent that will not lead to the weakening of the photoinitiation. However, the addition of the oxygen-consuming components may affect the polymerization system photochemically. For example, if the absorption band of the singlet oxygen generator/trapper overlaps with the absorption band of the photoinitiator, the generator will become a competing absorbing species for the light source during the process of photoinitiation. If the singlet oxygen trapper is not favored by the polymerization, large amount of residue will result in the lowering of the polymerization rate. The exact role of the generator and trapper always varies in different polymerization system, but there are several starting points that need to be considered before applying the oxygen-consuming system:

1) Compare the absorption spectra of photoinitiator, and oxygen-consuming component, choose those generator and trappers that will not absorb at same region as the photoinitiator;
2) If overlap of the absorptions is unavoidable, consider a photo bleaching dye.

3) The concentration for the singlet oxygen trapper should be a little higher than the oxygen concentration in the monomer due to the fact that the reaction between a singlet oxygen and trapper is in a 1:1 stoichiometry. (The oxygen concentration of most organic solvents is on the order of magnitude of $10^{-3}$ M).

Of course, the concentration of the component also depends on their solubility in the monomer, but the range of concentration we recommend are:

Singlet oxygen generator: $10^{-5}$ M~$5\times10^{-4}$ M
Singlet oxygen trapper: $10^{-2}$ M~$10^{-3}$ M Example 8

Enhancement of the Free Radical Polymerization Rate due to Oxygen Consumption

In addition to the previous photoinitiation system, a typical commercial acrylate coating formulation for optical fibers was tested in combination with the oxygen consumption system (singlet oxygen generator/trapper) to verify the effectiveness of the approach.

These studies were carried out using Zn-ttp as the singlet oxygen generator, and DMA as singlet oxygen trapper.

The polymerization reaction rate as a function of time was determined using in situ differential scanning calorimetry (DSC) to measure the rate at which heat is released from the sample as a function of time. The rate at which heat is released from the sample is directly proportional to the polymerization rate since the polymerization reaction is exothermic.

The photopolymerization rate profile of the original coating formulation was obtained through DSC experiments performed under two conditions: nitrogen purging and air saturation.

To demonstrate the effect of the photochemical consumption of the oxygen on the polymerization kinetics, the coating samples containing Zn-ttp and DMA were subjected to illumination with 670 nm light from a diode laser prior to illumination with UV light. This 670 nm illumination results in consumption of the oxygen according to the reaction scheme shown above (it is important to note that only Zn-ttp absorbs light at this wavelength). Comparison of the reaction kinetics observed for a coating sample containing Zn-ttp and DMA subjected to this 670 nm illumination to the reaction kinetics for a pure coating formulation which had no 670 nm illumination illustrates the effect of oxygen consumption on the polymerization rate. The samples were illuminated with light from a 200 W Xe—Hg arc lamp at time zero to initiate the photopolymerization. Preliminary studies confirmed that the 670 nm pre-illumination did not lead to the production of free radical active centers.

Figure 11:
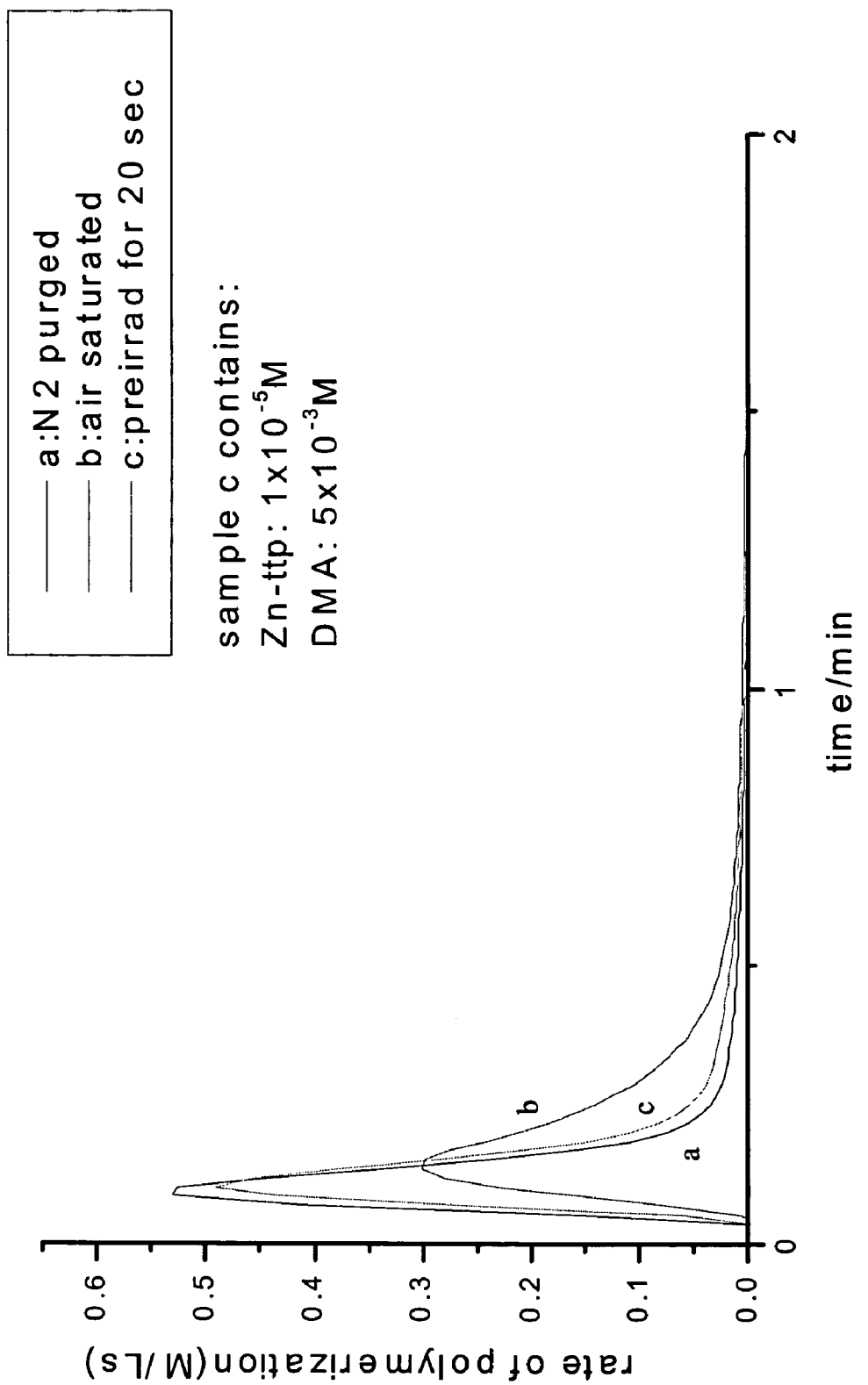
FIG. 11 shows polymerization rate as a function of time for a coating formulation from Example 8. Samples a and b are pure coating formulations; sample c is the coating formulation containing 0.005 M DMA and $10.1 \times 10^{-5}$ M Zn-ttp. The experiment for sample c was carried out under air-saturated conditions, and the sample was pre-illuminated with 670 nm light from a diode laser.

FIG. 11 illustrates the effect of the 670 nm illumination on the reaction kinetics of the coating formulation. Compared to the sample with nitrogen purging conditions, there was a pronounced decrease of the maximum rate and prolongation of the time required to reach this rate relative to the sample in air-saturated conditions. However, after the oxygen consumption formulation (Zn-ttp and DMA) had been added to the system, the inhibitory effect was significantly reduced upon the pre-illumination with a 670 nm diode laser for the polymerization under air-saturated conditions. The rate profile of the pre-illuminated sample in the air is close to that of the nitrogen-purged sample in which almost no molecular oxygen exists. These results indicate that the observed enhancement in the polymerization rate and reduction in the inhibition time result from the photochemical consumption of the oxygen in the reaction system.

Figure 12:
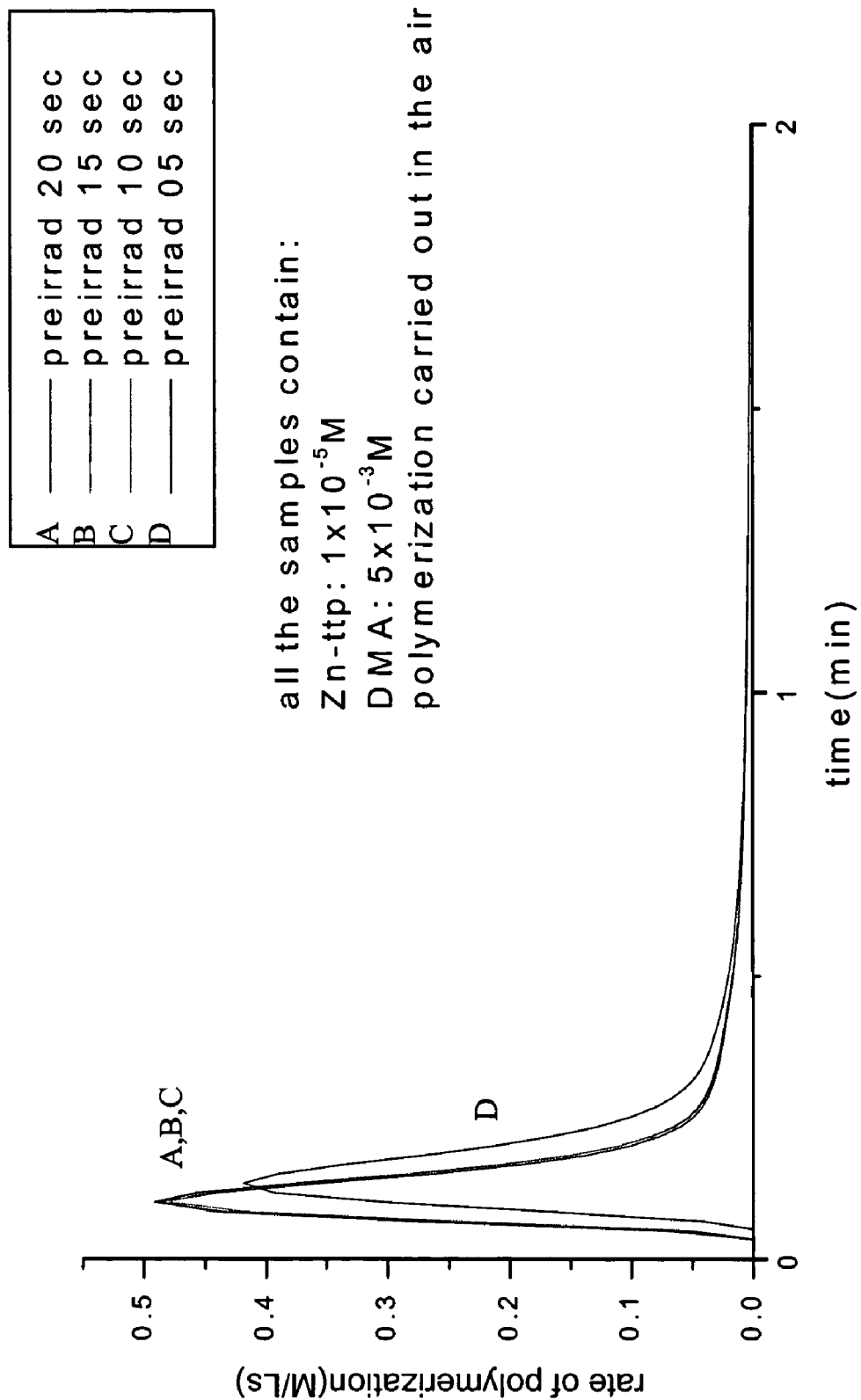
FIG. 12 shows the effect of pre-illumination time on the polymerization rate of the coating formulation from Example 8. All three samples contain 0.005 M DMA and $1.0 \times 10^{-5}$ M Zn-ttp. The pre-illumination was carried out a with 670 nm diode laser.

The effect of pre-illumination time on the reaction kinetics is shown in FIG. 12. The peak rate for the system keeps increasing with the increasing LASER exposure time before the polymerization. However, the improvement on maximum rate is negligible when pre-illumination time exceeds 10 seconds, which suggests that most of the molecular oxygen has been consumed in 10 seconds.

The concentration for the singlet oxygen generator and trapper in the photoinitiation system determines the ultimate effectiveness of the current approach. To achieve the prompt elimination of oxygen, it is desired to increase the concentration of the generator to a maximum extent that will not lead to the weakening of the photoinitiation. However, the addition of the oxygen-consuming components can affect the polymerization system photochemically.

Figure 13:
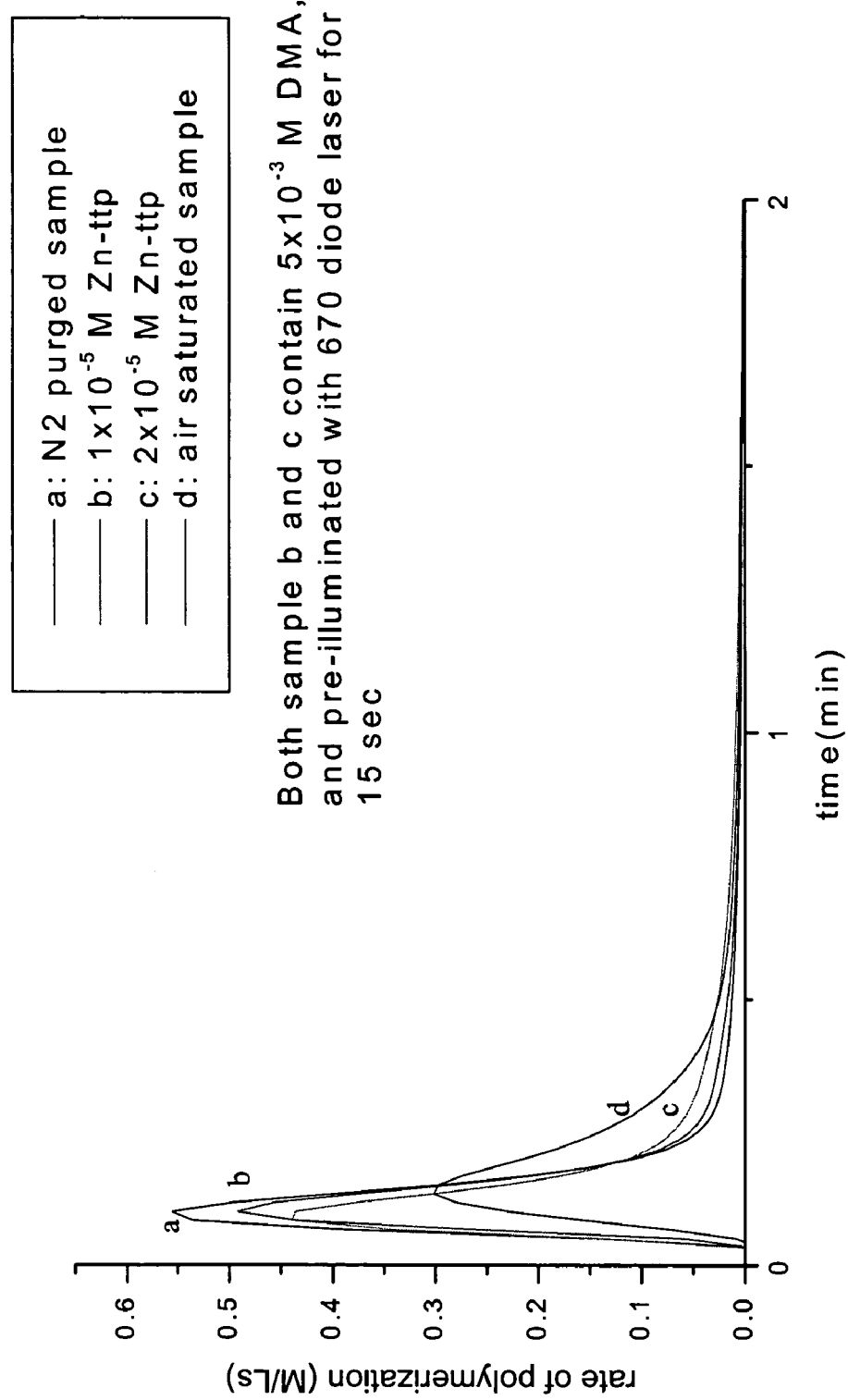
FIG. 13 shows the effect of singlet oxygen generator concentration on the polymerization rate of the coating formulation from Example 8. Sample b contains 0.005 M DMA and $1.0 \times 10^{-5}$ M Zn-ttp; sample c contains 0.005 M DMA and $2.0 \times 10^{-5}$ M Zn-ttp.
Figure 14:
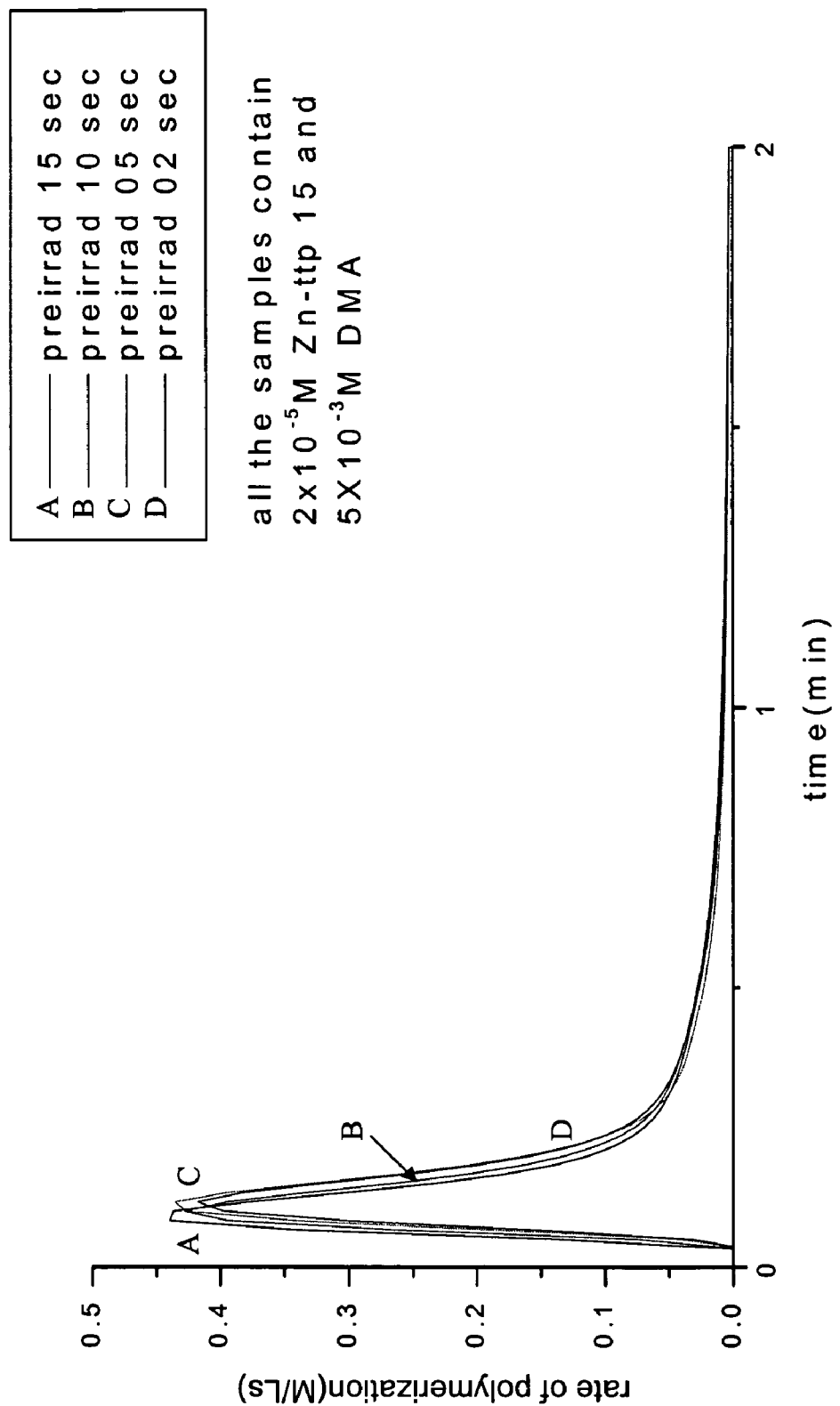
FIG. 14 shows the effect of pre-illumination time on the polymerization rate of the coating formulation from Example 8. All three samples contain 0.005 M DMA and $2.0 \times 10^{-5}$ M Zn-ttp. The pre-illumination was carried out a with a 670 nm diode laser.

The DSC results shown in FIG. 13 and FIG. 14 illustrate the two-fold effect of singlet oxygen generator concentration on the rate of polymerization. A comparison of rate profiles for the sample containing different concentrations of Zn-ttp is shown in FIG. 13. The DSC experiment results for a pure sample were also presented as reference. From FIG. 13, it is clear that although both samples containing the oxygen consumption formulation achieved the enhancement in the reaction rate, the one with doubled concentration of Zn-ttp has a lower maximum rate. On the other hand, the increase of singlet oxygen generator concentration resulted in an improvement in the oxygen consumption speed, which is indicated in FIG. 14. For the sample containing a higher concentration of Zn-ttp, the maximum rate ceased increasing for pre-illumination longer than 5 seconds, which suggest that the most of molecular oxygen have been consumed within 5 seconds.

Figure 15:
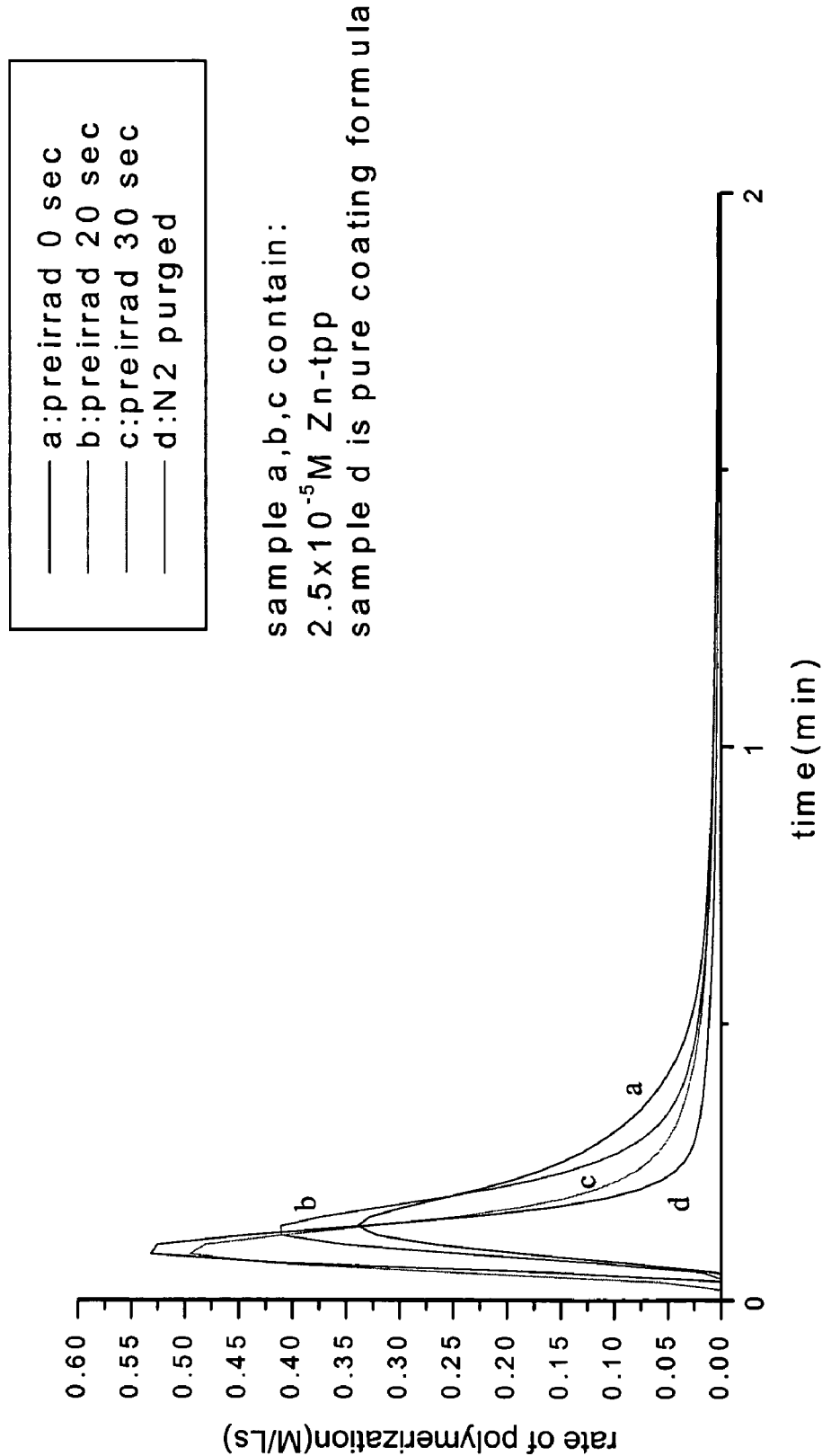
FIG. 15 shows the effect of pre-illumination time on the polymerization rate of the coating formulation containing only Zn-ttp from Example 8.

The coating formulation itself acted as a singlet oxygen trapper. FIG. 15 shows that for the coating sample containing only single oxygen generator (Zn-ttp), an enhancement in the reaction rate was observed. The variation of pre-illumination time indicated that enhancement of rate was proportional to the LASER exposure time in the range of 30 seconds. These results suggest that singlet oxygen produced upon the photosensitization of Zn-ttp was stabilized by the coating system, though at a slower rate compared with DMA.

These studies on the polymerization of the Alcatel coating formulation demonstrate that the photochemical method for eliminating oxygen inhibition in polymerizations does result in an enhanced polymerization rate for free radical polymerizations carried out in an oxygen atmosphere. All of the results are consistent with idea that the porphyrin serves as an efficient singlet oxygen generator, and DMA serves as a singlet oxygen trapper.

Example 9

Effect of Pre-Illumination of the Free Radical Photopolymerization Rate Profile of a triacrylate monomer This example describes experiments that were performed to investigate the effect of pre-illumination on the free radical photo-polymerization rate profile of a triacrylate monomer—pentaerythritol triacrylate (PTA). The experiment results confirmed that the oxygen inhibition effect can be reduced or eliminated using this method. Most notably, presented is one example of a system (low light intensity) for which the polymerization is normally completely inhibited by oxygen (no reaction is observed using standard illumination methods), but for which efficient polymerization is observed using the method described in this invention to consume the oxygen.

Experimental Methods

The photopolymerization rate profile of the PTA/DMPA system was obtained through DSC experiments performed under two conditions: nitrogen purging and air saturation.

To demonstrate the effect of the photochemical consumption of the oxygen on the polymerization kinetics, the sample containing Zn-ttp and DMA was subjected to illumination with 670 nm light from a diode laser prior to illumination with UV light. The probe of the laser was adjusted to approximate 10 cm above the DSC sample chamber, and the distributed spot of laser was positioned so that the reference and sample cell were radiated by equal amounts of the laser light. A 200 watt Xe—Hg lamp was used as the UV light source, and the intensity of the light was adjusted by adding neutral density filters and changing the height of the lamp (three different light intensities were investigated: 20, 6.5, and 0.35 $mW/cm^2$).

The amount of sample injected into the DSC pan ranged from 13.2 to 13.7 mg.

Before the photo-curing process, the sample was kept in the DSC chamber and purged with ambient atmosphere for 10 minutes to achieve the saturation.

Results and Discussion

Experimental Results: 20 $mW/cm^2$

Figure 16:
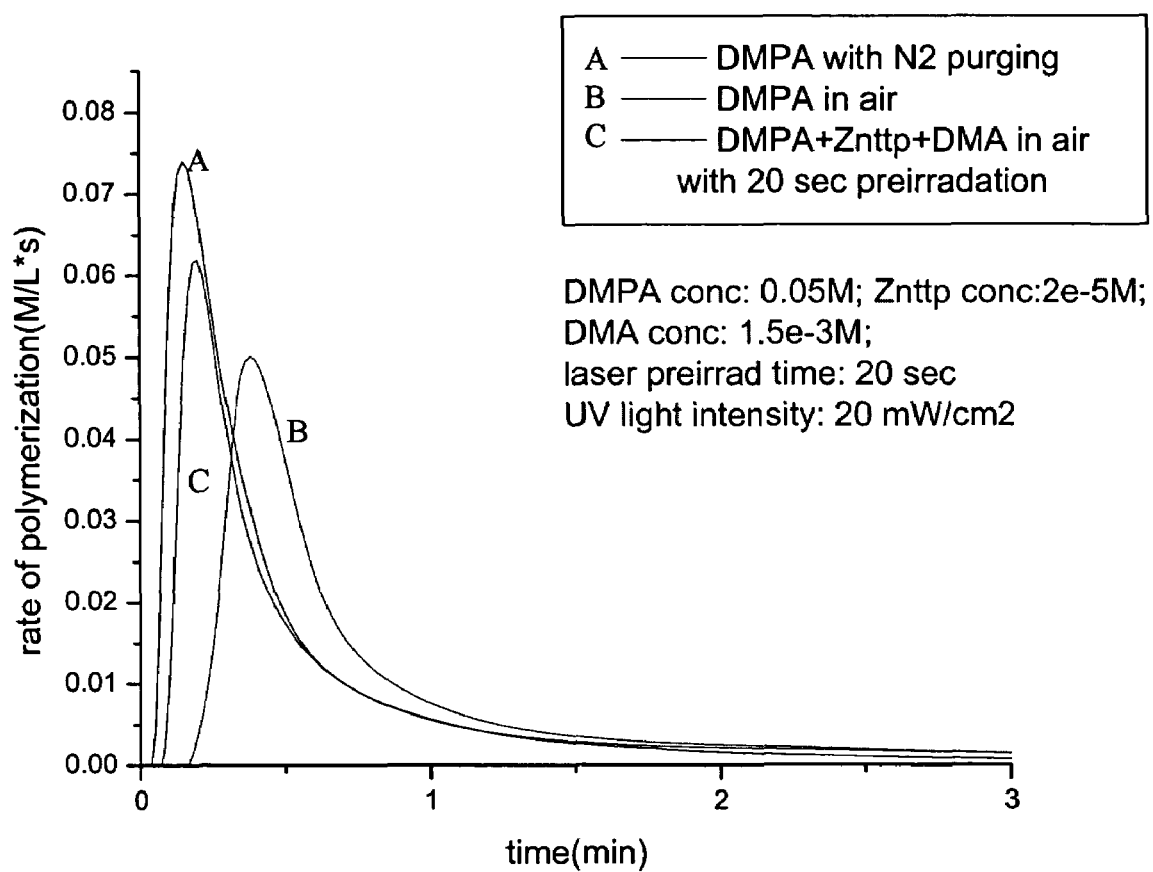
FIG. 16 shows the rate of polymerization for pentaerythritol triacrylate (PTA) as a function of time from Example 9.
A=DMPA with nitrogen (N$_2$) purging
B=DMPA in air
C=DMPA+Zn-ttp+DMA in air with 20 sec. pre-illumination
Photoinitiator: 0.05 M DMPA, SG: $2.0 \times 10^{-5}$M Zn-ttp, ST: $1.5 \times 10^{-3}$ M DMA. UV light intensity: 20 mW/cm$^2$.

In FIG. 16, the curve B corresponds to curing in air, the curve A corresponds to curing under nitrogen-purged conditions (the oxygen is completely eliminated using nitrogen), and the curve C corresponds to curing in air using the current photochemical method to consume the oxygen.

Comparing the air-cured (B) and nitrogen-purged (A) reaction rate profiles illustrates the effect of oxygen inhibition: there is a pronounced decrease of the maximum rate and prolongation of the time required to reach this rate due to the presence of the oxygen. However, as illustrated by the C curve, much of this inhibition is reduced using the current method. After the oxygen consumption formulation (Zn-ttp and DMA) had been added to the system, the inhibitory effect was significantly reduced upon the pre-illumination of 670 m diode laser for the polymerization under air-saturated condition. (The maximum rate was increased from 0.49 M/(l·s) to 0.62 M/(l·s), and the time to reach the reaction peak rate was decreased from 0.4 min to 0.2 min.) The rate profile of the pre-illuminated sample in the air is close to the one of the nitrogen-purged sample in which almost no molecular oxygen exists. These results indicate that the observed enhancement in the polymerization rate and reduction in the inhibition time result from the photochemical consumption of the oxygen in the reaction system.

Experimental Results: 6.5 $mW/cm^2$

Figure 17:
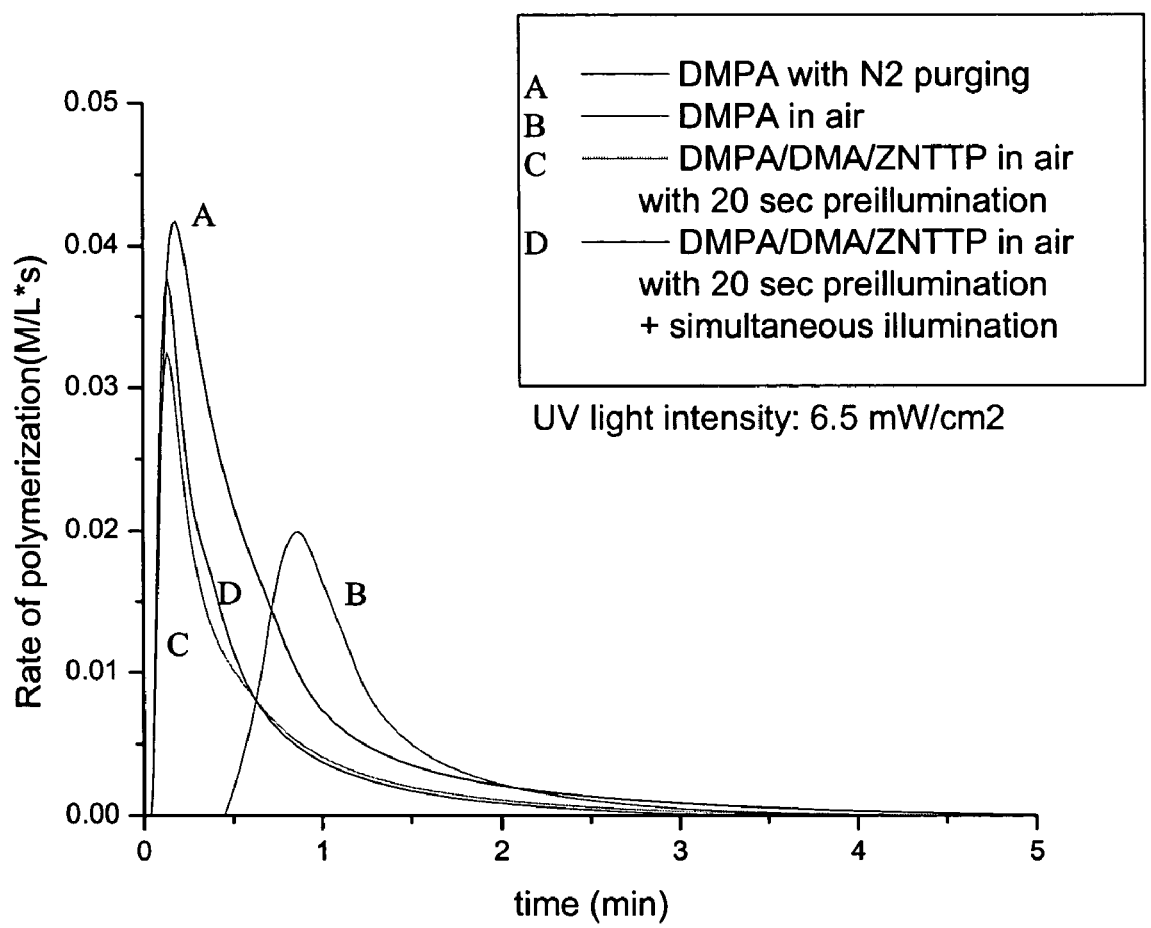
FIG. 17 shows the rate of polymerization for PTA as a function of time from Example 9.
A=DMPA with nitrogen (N$_2$) purging
B=DMPA in air
C=DMPA+Zn-ttp+DMA in air with 20 sec. pre-illumination
D=DMPA+Zn-ttp+DMA in air with 20 sec. pre-illumination+simultaneous illumination
Photoinitiator: 0.05 M DMPA, SG: $2.0 \times 10^{-5}$M Zn-ttp, ST: $1.8 \times 10^{-3}$ M DMA. UV light intensity: 6.5 mW/cm$^2$.

FIG. 17 illustrates the effectiveness of the photochemical method to reduce or eliminate oxygen inhibition at lower light intensities and shows that pre-illumination using the 670 nm light followed by simultaneous illumination by the UV light and the 670 nm light can be used to enhance the effectiveness of the method.

For the 6.5 $mW/cm^2$ UV light source, the current method again led to a notable improvement in the peak polymerization rate in an air environment (comparison of the curve C, to the curve B). More importantly, the inhibition period has been completely eliminated using the method according to the rate profiles shown in FIG. 17, (C) which suggest fully consumed dissolved oxygen before the photopolymerization. However, the reaction rate dropped rapidly compared with the nitrogen-purged sample (A) after reaching the peak. A possible explanation is the effect of diffused oxygen is becoming more significant in the case of low UV light intensity and the lowered reaction rate. The rate profile of the polymerization with simultaneous laser illumination (the D curve) shows some evidence of the enhanced monomer conversion, which indicates that the combination of DMA/Zn-ttp and laser is capable of consuming the molecular oxygen during the process of polymerization.

Experimental Results: 0.35 mW/cm$^2$

At still lower light intensities, the effect of the photochemical method to reduce or eliminate oxygen inhibition is even more dramatic.

Figure 18:
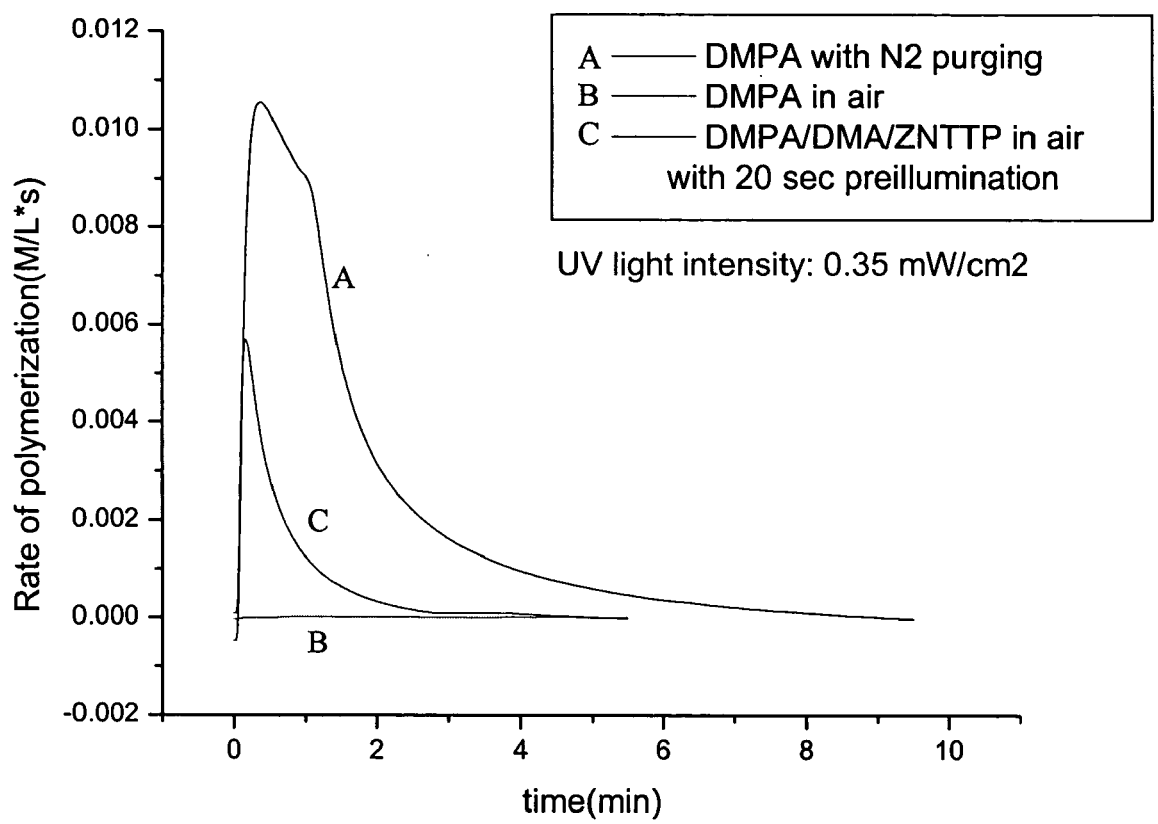
FIG. 18 show the rate of polymerization for PTA as a function of time from Example 9.

FIG. 18 illustrates that, for the 0.35 mW/cm$^2$ UV light no polymerization at all is observed for sample containing 0.05M DMPA in an air environment (B) suggesting that the propagation of the active centers was completely inhibited by the dissolved oxygen in this case. However, the addition of the DMA/Zn-ttp system and the pre-illumination successfully induced the photo-curing of the samples in the air under the same condition of UV light source (the C curve). This result again proved that the current oxygen consumption system (Zn-ttp/DMA) can effectively consume the dissolved oxygen upon the illumination of a 670 run laser and start the polymerization for a system completely inhibited by molecular oxygen.

Example 10

Determination of Oxygen Concentration in Monomers

The effect of oxygen on the kinetic profile of polymerization cannot be fully understood unless reliable experimental data for the dissolved oxygen concentration in the monomer is obtained. *Photoinitiators for Free Radical Cationic & Anionic Photopolymerization 2nd Edition*, J. V. Crivello & K. Dietliker, Edited by G. Bradley, John Wiley and Sons Ltd in association with SITA Technology Ltd, 1998. However, there are relatively few reports in the literature on the solubility of oxygen in commercial monomers. This lack of data arises in part from the difficulty of measuring oxygen concentrations in organic liquids, such as monomers, since most of the traditional manometric and volumetric methods (Battino R. and Clever H. L., Chem. Rev., 1966, 66, 395) for measuring oxygen concentrations are not well suited for highly viscous or volatile organic monomers. In addition, most electrochemical or optical oxygen sensors have been developed for aqueous solutions and are not appropriate for monomer liquids. Since these sensors are designed for aqueous solutions, they invariably have components (such as separation membrane and sol-gel) that are vulnerable to attack or dissolution by the organic liquids. U. Guth, W. OelBner and W. Vonau, Electrochimica Acta, Volume 47, Issues 1–2, 1 Sep. 2001, pp. 201–210.

To address these difficulties, a photochemical approach to obtain the oxygen concentration in monomer systems was developed. This method is free of chemical corrosion and consumes less analyte without complicated experimental setup.

This photochemical method allows the oxygen concentration in an organic liquid to be measured indirectly by first creating the first excited singlet state oxygen by energy transfer from a photoexcited dye (singlet oxygen generator) then reacting the singlet oxygen with a second compound, the singlet oxygen trapper. Therefore, this method requires the addition of small amounts of two compounds to the monomer: a singlet oxygen generator and a singlet oxygen trapper.

The oxygen is measured indirectly by monitoring the change in the concentration of the singlet oxygen trapper as it is consumed by reaction with the singlet oxygen.

The current experiment presents selection criteria for the two components that are designed for monomer systems and demonstrates the application of the method to determine the oxygen concentration in seven monomers:
1) 2-hydroxyethyl methacrylate (HEMA);
2) Butyl Acrylate;
3) 1,6-Hexanediol diacrylate (HDDA);
4) Triethylene glycol dimethacrylate (TDMA);
5) Trimethylolpropane triacrylate (TMPTA);
6) Ethoxylated (2)hydroxyethyl methacrylate (CD570); and
7) Tripropylene glycol diacrylate (SR306).

Selection of the Singlet Oxygen Generator

In the present photochemical method, the singlet oxygen generator is the light-absorbing compound which is responsible for the production of singlet oxygen through the well-known triplet-triplet annihilation (TTA) process.

The selection criteria of a singlet oxygen generator are:
1) The dye must be soluble in the monomer of interest;
2) The dye must have a triplet state which is sufficiently long-lived to undergo TTA with ground state oxygen;
3) The triplet state energy of the dye should be slightly higher than the energy of singlet oxygen to achieve the efficient energy transfer; and
4) The dye should exhibit a high quantum yield of singlet oxygen. A variety of organic dyes are available which meet these criteria to some degree, including: rose bengal, methylene blue, eosin, porphyrins, etc.

In this study, we selected a kind of porphyrin—5,10,15,20-tetraphenyl-21H,23H-porphine zinc (Zn-tpp)—as the singlet oxygen generator.

Selection of the Singlet Oxygen Trapper

The role of the singlet oxygen trapper (ST) is to react with singlet oxygen (thereby removing the oxygen from the system) before it has chance to "relax" back to the ground state. Therefore, the ST selection criteria are:
1) It must rapidly react with excited singlet oxygen but must be non-reactive toward both the ground triplet oxygen and the unreacted monomer;
2) The ST must undergo a change in absorbance properties upon reaction with the singlet oxygen; and
3) The ST must be soluble in the monomers.

Singlet oxygen is more electrophilic than the ground state oxygen and is, therefore, capable of reacting with a variety of electron-rich organic compounds, such as fused-ring aromatics. The three most common reactions between singlet oxygen and unsaturated organic compounds are:
1) [2+2] cycloaddition to the electron-rich carbon double bonds to produce cyclic peroxides;
2) cycloaddition with 1,3-dienes and polynuclear aromatics to produce endoperoxides; and
3) the "ene" reaction with carbon double bond possessing an allylic hydrogen. Compounds that participate in these reactions with singlet oxygen are candidates for the ST.

To identify specific compounds that may serve as the ST, it is useful to consider the reaction kinetic requirements in more detail. The product of the rate constant for reaction with oxygen and the concentration of the ST must be higher than the rate constant for relaxation of the singlet oxygen back to the ground triplet state (which is the inverse of the singlet state lifetime in the absence of the quencher). Since the singlet oxygen lifetime in organic liquids and monomers is typically on the magnitude of $10^{-3}$ seconds and the concentration of the ST should be on order of $10^{-3}$ M (slightly higher than the oxygen concentration), the rate constant for reaction of the ST with singlet oxygen should be on the order of $10^6$ M$^{-1}$sec$^{-1}$ or higher. The competing chemical reactions and the resulting constraints on the reaction rate constants are illustrated by equations 1 through 4 below.

$$^1O_2 \xrightarrow{k_d} {}^3O_2 \qquad r_d = k_d[^1O_2] = \frac{1}{\tau} \cdot [^1O_2] \qquad (1)$$

$$^1O_2 + ST \xrightarrow{k_q} \text{product} \qquad r_q = k_q[^1O_2][ST] \qquad (2)$$

$$\text{Criteria: } r_q > r_d \Rightarrow k_q[^1O_2][ST] > \frac{1}{\tau} \cdot [^1O_2] \qquad (3)$$

$$\text{therefore: } k_q > \frac{1}{\tau \cdot [ST]} \qquad (4)$$

In these equations:
$^1O_2$ represents the excited singlet state oxygen;
$^3O_2$ represents the ground triplet state oxygen;
ST represents the ST;
$r_d$ is the rate of singlet oxygen deactivation in pure solvent;
$k_d$ is the rate constant of singlet oxygen deactivation;
$\tau$ is the lifetime of the excited singlet oxygen;
$r_q$ is the rate of reaction between ST and singlet oxygen; and
$k_q$ is the rate constant of ST.

The stability of ST in the monomer is a second important issue. Many conjugated compounds that react with singlet oxygen will also undergo Diels-Alder reactions with unsaturated monomers. For example, 1,3-diphenyl-isobenzofuran (DPBF) is a highly reactive diene which will react with alkenes through 1,4-addition reaction. As a result of this reaction, the DPBF is chemically consumed and a corresponding decrease in the UV-visible absorbance spectrum is observed. The rate of consumption of the DPBF depends upon the specific alkene, however we found that its lifetime in monomers is very short. For example, in experiments in which $1 \times 10^{-3}$ M DPBF was dissolved in 2-hydroxyethyl-methacrylate (HEMA), no appreciable absorption from DPBF could be observed after 15 minutes at room temperature. Since, in the photochemical method, the oxygen concentration is ultimately determined by measuring the decreased absorbance of the ST, it is important that the trapper will not undergo degradation in the absence of oxygen and illumination, therefore DPBF is not an appropriate choice.

Based upon the considerations outlined above, 9,10-dimethylanthracene (DMA), was selected as the ST for study. DMA undergoes a [4+2] cycloaddition reaction with singlet oxygen. In contrast to DPBF, DMA is very stable in the unsaturated acrylate monomers. We have performed experiments in which $10^{-3}$ M DMA was dissolved in HEMA, we observed no decrease in absorption peak of DMA even after 2 hours at room temperature. In addition, the mechanism by which DMA reacts with singlet oxygen to produce endoperoxides is well established. B, Ranby, J. F. Rabek, Photodegradation, photo-oxidation and photostabilization of Polymers. Wiley Interscience, London (1975) 314. The stoichiometry of the reaction between DMA and singlet oxygen is 1:1 and the rate constant is reported as high as $2.4 \times 10^7$ M$^{-1}$sec$^{-1}$ (Harry H. Wasserman, Robert W. Murray. Singlet Oxygen (1979) 234), which makes DMA a very efficient ST (and meets the criteria that the rate constant should be higher than $10^6$ M$^{-1}$sec$^{-1}$).

The mechanism of the proposed method can be expressed as follows:

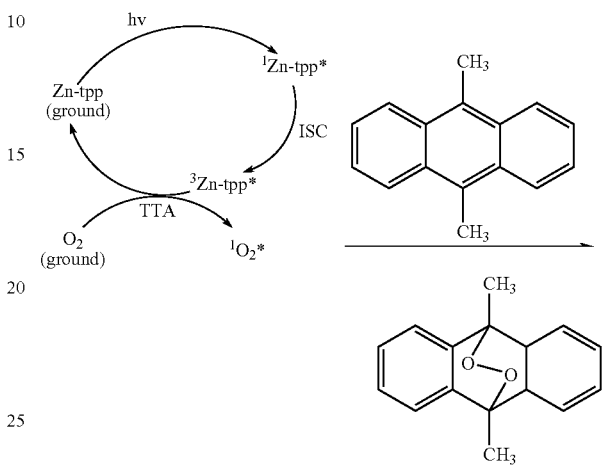

Experimental Setup

The UV-Vis spectra were recorded with an Agilent 8453 Spectrophotometer. An Oriel 69052 Spectral Luminator with the ability to control the output emission wavelength was used as the light source to induce the photochemical reactions.

The mixture of singlet oxygen generator, singlet oxygen trapper (DMA), and monomer were prepared on the same day of the experiment.

Air-saturation of the sample was achieved after 30 minutes stirring. (Preliminary studies showed that there is no appreciable effect on the result if the sample was bubbled with air for 20 minutes after stirring.)

A 1-mm path quartz sample cell was selected to obtain the spectra of the relatively high concentration of DMA (which corresponds to the magnitude of dissolved oxygen concentration in organic solvent).

The sample in the cell was sealed with light mineral oil. (For monomers with a density below 0.9 g/ml, stopcock grease was used instead of light mineral oil.)

An Oriel optical filter (Oriel glass filter 59490) was placed between the light source and the sample cell to remove the second or third order diffraction from monochromater. The exit slit size of the Spectral Laminator was set at 20 nm. The wavelength of the Spectrum Luminator was adjusted to overlay with the longer absorption band of the singlet oxygen generator.

For each series of experiments, the overlaid absorption spectrum of the solution containing singlet oxygen generator and trapper was recorded first. Then, the sample cell was irradiated by the Spectrum Luminator for 10 seconds before the absorption spectrum was collected again. The measurement was repeated 20–30 times until the absorption of the singlet oxygen trapper became stable. All the measurements were made at an ambient temperature of 21° C.

Results and Discussion

Unlike DPBF, no indication of competing photodegradation of DMA was detected.

Before measurement of the oxygen concentration, Zn-tpp and DMA were separately dissolved in the monomer of interest and irradiated with the Spectrum Luminator. No appreciable photobleaching of DMA and Zn-tpp were observed upon illumination at the Q band of Zn-tpp.

The relatively higher stability of Zn-tpp further strengthens its advantage as a singlet oxygen generator over rose bengal and methylene blue.

To identify the possible photochemical processes involved in the absence of molecular oxygen, a monomer solution containing both Zn-tpp and DMA was degassed with argon for 10 minutes, and the absorption of overlaid spectra was measured before and after illumination. No appreciable decay was observed. The result suggests that, apart from the singlet oxygen-induced DMA decay, no significant side reactions were involved during the process of illumination.

The characteristic absorption of DMA consists of three continuous peaks. In this study, the absorbance of $2^{nd}$ peak (which is around 380 nm) was recorded to follow the decay of DMA because there is no significant absorbance from other components in this region.

FIG. 19 illustrates the overlaid absorption spectra decay of HEMA solution containing $1 \times 10^{-4}$ M Zn-tpp and $1.8 \times 10^{-3}$ M DMA. The absorption recorded at 380 nm underwent a linear decay over irradiation time. Results from the other six monomers showed a similar trend. The absorption became stable after 80 seconds of illumination, and the plot of absorbance over time displays a clear turning point which indicates the complete consumption of oxygen.

The results of this photochemical experiment are presented in Table 1. DMA was used as the singlet oxygen trapper in all the experiments. Rose bengal, methylene blue, and Zn-tpp were used in the experiment of HEMA to identify the effect of different singlet oxygen generators on the photodegradation of DMA. The final results show that there was no obvious differences between the different dyes at the concentration applied in the current study.

Since the overlaid spectra might shift in different monomers, the wavelength of the Luminator and the recorded absorbance were adjusted to accommodate the changes. The concentration of the singlet oxygen generator and trapper is listed in Table 1. The standard deviation ranged from 0.002 to $0.019 \times 10^{-3}$ mol/l.

Table 1 illustrates that the experimental values for the dissolved oxygen depend significantly on the structure of the acrylate monomers, and range from a low of $0.59 \times 10^{-3}$ moles/liter for the ethoxylated (2)-hydroxyethylmethacrylate to a high of $2.07 \times 10^{-3}$ moles/liter for butyl acrylate. In addition, the experimental results shown in Table 1 illustrate some interesting correlations between the monomer structure and the DO concentration. For example, the relatively low DO concentration observed for HEMA suggests that the presence of the hydroxyl group lowers the oxygen solubility (this is consistent with oxygen solubility trends in organic solvents).

TABLE 1

Dissolved oxygen concentration in air-saturated monomers.

| Monomer | SG | SG conc. ($10^{-4}$ mol/l) | DMA conc. ($10^{-3}$ mol/l) | Excitation wavelength (±10 nm) | DO conc. ($10^{-3}$ mol/l) | Std. Dev. ($10^{-3}$ mol/l) |
|---|---|---|---|---|---|---|
| HEMA[1] | Zn-tpp | 1.00 | 2.00 | 557 | 0.83 | 0.002 |
|  | MB | 1.00 | 2.00 | 663 | 0.82 | 0.005 |
|  | RB | 1.00 | 2.00 | 563 | 0.80 | 0.009 |
| HDDA[2] | Zn-tpp | 1.00 | 2.00 | 556 | 1.17 | 0.004 |
| Butyl Acrylate | Zn-tpp | 1.00 | 2.50 | 553 | 2.07 | 0.019 |
| E-HEMA[3] | Zn-tpp | 1.00 | 2.00 | 557 | 0.59 | 0.005 |
| TPGDA[4] | Zn-tpp | 1.00 | 2.00 | 555 | 1.43 | 0.014 |
| TEGDMA[5] | Zn-tpp | 1.00 | 2.00 | 554 | 0.98 | 0.002 |
| TMPTA[6] | Zn-tpp | 0.1 | 2.00 | 550 | 1.05 | 0.012 |

[1] 2-hydroxyethyl methacrylate;
[2] 1,6-hexanediol diacrylate;
[3] ethoxylated (2)-hydroxyethyl methacrylate;
[4] tripropylene glycol diacrylate;
[5] triethyleneglycoldimethacrylate;
[6] trimethylolpropanetriacrylate The primary concerns about this method concentrate on the possible deviation from the real value of oxygen solubility caused by the addition of the singlet oxygen generator and trapper. The activity coefficient of a gas in a solution depends on the concentrations of all the solutes present in the system. The relation between the gas solubility in solution and pure solvent can be expressed as $$\log \frac{Si^\circ}{Si} = k_s C_s$$

where the $Si^{-\circ}$ and Si are the gas solubilities in pure solvent and solution, respectively. Cs is the composition of salt, and ks is the salt effect coefficient.

A salt added into the solution can either increase or decrease the solubility of a certain gas in the solvent. These two opposite effects are referred to "salt out" and "salt in," respectively. The possible factors that might affect the solubility of gases in salt solution include: electrostatic forces, dispersion forces, and internal pressure of the salt solution, etc.

The data presented in Table 2 clearly indicates that DMA has a "salt in" effect on the solubility of oxygen in HEMA.

TABLE 2

Effect of DMA concentration on the solubility of oxygen in HEMA.

| Conc. of DMA ($10^{-3}$ mol/l) | 1.2 | 1.4 | 1.6 | 1.8 | 2.0 | 2.2 |
|---|---|---|---|---|---|---|
| Conc. Of DO ($10^{-3}$ mol/l) | 0.834 | 0.831 | 0.827 | 0.828 | 0.817 | 0.812 |

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for addressing oxygen inhibition in a free radical polymerization system comprising
    (a) adding
        (i) a singlet oxygen generator,
        (ii) a singlet oxygen trapper,
        (iii) a free radical polymerizable monomer or oligomer, and
        (iv) an initiator, wherein the singlet oxygen trapper does not react with the free radical polymerizable monomer or oligomer;
    (b) illuminating the system at a wavelength which activates the singlet oxygen generator; and
    (c) initiating photopolymerization of the monomer or oligomer.

2. The method of claim 1 wherein the polymerization of the monomer is initiated with light.

3. The method of claim 1 wherein the singlet oxygen generator meets the following criteria:
    (a) triplet excited state exists long enough to encounter $O_2$; and
    (b) triplet energy versus singlet energy differential which gives efficient $O_2$ production without efficient back reaction.

4. The method of claim 1 wherein the singlet oxygen generator comprises a porphyrin.

5. The method of claim 1 wherein the singlet oxygen generator comprises 5,10,15,20-tetraphenyl-21 H,23H-porphine zinc, synthetic; zinc 5,10,15,20-tetra(4-pyridyl)-2 1 H,23H -porphine; zinc 2,9,16,23 -tetra-tert-butyl-29H,31 H-phthalocyanine (Zn-ttp); or mixtures thereof.

6. The method of claim 1 wherein the singlet oxygen trapper meets the following criteria:
    (a) rate of reaction of the singlet oxygen sufficiently high to allow reaction to take place during lifetime of singlet oxygen,
    (b) does not react with ground state (triplet) oxygen, and
    (c) is stable in an $O_2$-containing environment-saturated monomer.

7. The method of claim 6 wherein the singlet oxygen trapper comprises enamines, polynuclear aromatics, pyrroles, furans, alkenes containing one or more allylic hydrogens, or mixtures thereof.

8. The method of claim 1 wherein the singlet oxygen trapper comprises 9,10-dimethylanthracene (DMA), N,N,2-trimethylpropenylamine, 6-(dimethylamino)fulvene, or mixtures thereof.

9. The method of claim 1 wherein the initiator is a free radical photoinitiator.

10. The method of claim 1 wherein the monomer comprises an acrylate monomer.

11. The method of claim 1 wherein the monomer comprises a methacrylate monomer.

12. The method of claim 1 wherein steps (b) and (c) may be executed in the given order or essentially simultaneously.

13. The method of claim 1 further comprising
    (d) decomposing an oxygenated trapper product generated by a reaction between the singlet oxygen trapper and the singlet oxygen generated by the singlet oxygen generator.

14. The method of claim 13 wherein the trapper-$O_2$ compound is a hydroperoxide, endoperoxide, or dioxetane.

15. The method of claim 13 wherein decomposition is by heat, light, or reaction with a third component to produce free radicals.

16. A composition for addressing oxygen inhibition in a free radical photopolymerization system/improved free radical photopolymerization comprising
    (a) a singlet oxygen generator and
    (b) a singlet oxygen trapper, wherein the singlet oxygen trapper does not react with a free radical polymerizable monomer or oligomer.

17. The composition of claim 16 further comprising a monomer or oligomer.

18. The composition of claim 17 further comprising an initiator.

19. A method of free radical polymerization comprising
    (a) adding
        (i) a singlet oxygen generator,
        (ii) a singlet oxygen trapper;
        (iii) a monomer or oligomer, and
        (iv) an initiator, wherein the singlet oxygen trapper does not react with the monomer or oligomer;
    (b) pre-illuminating (i)–(iv) wherein the wavelength excites the singlet oxygen generator;
    (c) initiating photopolymerization of the monomer or oligomer.

20. The method of claim 19 wherein the wavelength that excites the singlet oxygen generator is in the red or near infrared (IR) spectrum.

21. A method of free radical polymerization comprising
    (a) adding
        (i) a singlet oxygen generator,
        (ii) a singlet oxygen trapper,
        (iii) a monomer or oligomer,
        (iv) a photoinitiator, wherein the singlet oxygen trapper does not react with the monomer or oligomer;
    (b) illuminating by a first wavelength and a second wavelength wherein the first wavelength excites the singlet oxygen generator and wherein the second wavelength is absorbed by the photoinitiator whereby polymerization of the monomer or oligomers is initiated.

22. The method of claim 21 wherein illumination by the first wavelength is followed by illumination by the second wavelength.

23. The method of claim 21 wherein illumination by the first and second wavelengths is essentially simultaneous.

24. A method comprising
    (a) adding
        (i) a singlet oxygen generator, (ii) a singlet oxygen trapper, (iii) a monomer or oligomer, wherein the singlet oxygen trapper does not react with the monomer or oligomer;

(b) consuming oxygen by activating the singlet oxygen generator in the presence of molecular oxygen to form singlet oxygen whereby the singlet oxygen trapper consumes the singlet oxygen; and (c) initiating photopolymerization of the monomer or oligomer.

25. A method of increasing the rate of free radical polymerization in an oxygen-containing environment comprising (a) adding a singlet oxygen generator and a singlet oxygen trapper to a free radical polymerization system wherein the free radical polymerization system comprises monomer or oligomer and initiator, and wherein the singlet oxygen trapper does not react with the monomer or oligomer, (b) illuminating the system at a wavelength which activates the singlet oxygen generator, (c) initiating the photopolymerization of the monomer or oligomer.

26. A method of avoiding an inhibition period in free radical polymerization in an oxygen-containing environment comprising (a) adding a singlet oxygen generator and a singlet oxygen trapper to a free radical polymerization system wherein the free radical polymerization system comprises monomer or oligomer and initiator, and wherein the singlet oxygen trapper does not react with the monomer or oligomer, (b) illuminating the system at a wavelength which activates the singlet oxygen generator, (c) initiating the photopolymerization of the monomer or oligomer.

27. A method of increasing primary polymer chain length in free radical polymerization in an oxygen-containing environment comprising (a) adding a singlet oxygen generator and a singlet oxygen trapper to a free radical polymerization system wherein the free radical polymerization system comprises monomer or oligomers and initiator, and wherein the singlet oxygen trapper does not react with the monomer or oligomer, (b) illuminating the system at a wavelength which activates the singlet oxygen generator, and (c) initiating the photopolymerization of the monomer or oligomer.

28. A method of determining oxygen concentration in a monomer or oligomer comprising (a) adding (i) a singlet oxygen generator, (ii) a singlet oxygen trapper, (iii) a monomer or oligomer, wherein the singlet oxygen trapper does not react with the monomer or oligomer;

(b) consuming oxygen by activating the singlet oxygen generator in the presence of molecular oxygen to form singlet oxygen whereby the singlet oxygen trapper consumes the singlet oxygen;

(c) monitoring a change in concentration of singlet oxygen trapper until the concentration of singlet oxygen trapper is stable; and (d) correlating the stable concentration of singlet oxygen trapper with the concentration of oxygen.

29. The method of claim 28 wherein the singlet oxygen generator is a porphyrin.

30. The method of claim 28 wherein the singlet oxygen trapper is DMA.

31. The method of claim 28 wherein the concentration of singlet oxygen trapper is monitored by a change in absorbance.

* * * * *